US012566023B2

(12) United States Patent
Gumann et al.

(10) Patent No.: US 12,566,023 B2
(45) Date of Patent: Mar. 3, 2026

(54) MODULAR COOLING FARM FOR CRYOGENIC APPLICATION

(71) Applicant: International Business Machines Corporation, Armonk, NY (US)

(72) Inventors: Patryk Gumann, Tarrytown, NY (US); William Thomas Spratt, Croton-on-Hudson, NY (US); Stephen W. Bedell, Wappingers Falls, NY (US); Gilbert Bauer, Peekskill, NY (US); David Zarsky, Bethlehem, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 459 days.

(21) Appl. No.: 18/065,703

(22) Filed: Dec. 14, 2022

(65) Prior Publication Data

US 2024/0200846 A1 Jun. 20, 2024

(51) Int. Cl.
*F25D 3/10* (2006.01)
*F17C 3/08* (2006.01)
(Continued)

(52) U.S. Cl.
CPC .............. *F25D 3/102* (2013.01); *F17C 3/085* (2013.01); *F25D 3/005* (2013.01);
(Continued)

(58) Field of Classification Search
CPC ......... F25D 3/102; F25D 3/005; F25D 19/006; F17C 3/085; F17C 2203/0366;
(Continued)

(56) References Cited

U.S. PATENT DOCUMENTS 4,689,970 A 9/1987 Ohguma et al.
5,220,800 A 6/1993 Muller et al.
(Continued)

FOREIGN PATENT DOCUMENTS

CN 111623552 B 10/2020
DE 202005010892 U1 10/2005
(Continued)

OTHER PUBLICATIONS

M. Hollister, R. Dhuley, and G. Tatkowski, "A large millikelvin platform at Fermilab for quantum computing applications", Aug. 24, 2021, Fermi National Accelerator Laboratory, Batavia, IL, available at https://arxiv.org/abs/2108.10816v1.†

*Primary Examiner* — Joel M Attey
*Assistant Examiner* — Ibrahim A. Michael Adeniji
(74) *Attorney, Agent, or Firm* — Amin, Turocy & Watson, LLP

(57) ABSTRACT

Systems and/or methods provided herein relate to cooling of a component within a chamber of a cryostat. A system can comprise a cryostat having a cooling plate disposed within the cryostat, and a cooling feed line extending into the cryostat from external to the cryostat, which cooling feed line is thermally coupled to the cooling plate by a heat exchanger. In one or more embodiments, the system further can comprise a bulk cooling system that employs a liquifiable gas to provide cooling, wherein the bulk cooling system is fluidly coupled to the cooling feed line. In one or more embodiments, the system further can comprise a vacuum pump disposed at the cooling return line and external to the cryostat and physically decoupled from the cryostat by a section of the cooling return line disposed between the cryostat and the vacuum pump.

20 Claims, 11 Drawing Sheets

(51) Int. Cl.
*F25B 9/10* (2006.01)
*F25D 3/00* (2006.01)
*F25D 19/00* (2006.01)

(52) U.S. Cl.
CPC ................. *F17C 2203/0366* (2013.01); *F17C 2203/0391* (2013.01); *F17C 2250/0631* (2013.01); *F17C 2250/0689* (2013.01); *F25B 9/10* (2013.01); *F25D 19/006* (2013.01)

(58) Field of Classification Search
CPC ...... F17C 2203/0391; F17C 2250/0631; F17C 2250/0689; F25B 9/10
See application file for complete search history.

(56) References Cited

U.S. PATENT DOCUMENTS

| | | | | | |
|---|---|---|---|---|---|
| 5,267,445 | A | 12/1993 | Schittenhelm et al. | | |
| 9,816,750 | B2 † | 11/2017 | Batey | | |
| 2005/0010200 | A1 * | 1/2005 | Damasco | F25B 9/02 | 600/411 |
| 2005/0229609 | A1 * | 10/2005 | Kirichek | F25B 9/02 | 62/51.1 |
| 2007/0107445 | A1 * | 5/2007 | Boesel | F25D 19/006 | 62/51.1 |
| 2009/0049863 | A1 * | 2/2009 | Wang | F25D 19/00 | 62/616 |
| 2011/0219785 | A1 * | 9/2011 | Black | F17C 13/007 | 62/3.1 |
| 2014/0202174 | A1 * | 7/2014 | Wang | F25B 9/145 | 62/6 |
| 2014/0202179 | A1 * | 7/2014 | Batey | F25B 9/12 | 62/190 |
| 2018/0051852 | A1 * | 2/2018 | Wikus | F25D 19/006 | |
| 2019/0212049 | A1 * | 7/2019 | Strobel | F25D 19/006 | |
| 2019/0383525 | A1 * | 12/2019 | Matthews | F25B 9/10 | |
| 2021/0072098 | A1 * | 3/2021 | Tew, Jr. | G01K 1/08 | |
| 2022/0221104 | A1 * | 7/2022 | Chow | F17C 3/085 | |
| 2023/0088083 | A1 * | 3/2023 | Matthews | F25B 9/12 | 62/610 |
| 2024/0302081 | A1 * | 9/2024 | Decker | F25B 1/10 | |
| 2024/0344743 | A1 † | 10/2024 | Jiang | | |

FOREIGN PATENT DOCUMENTS

| | | | |
|---|---|---|---|
| DE | 102004054750 | A1 | 5/2006 |
| JP | 2582752 | Y2 | 10/1998 |

* cited by examiner
† cited by third party

MODULAR COOLING FARM FOR CRYOGENIC APPLICATION

FIELD OF THE INVENTION

The present disclosure relates generally to a cryostat, and more-particularly for use in lowering components internal to the cryostat to low temperatures, such as milli-Kelvin (mK) temperatures.

BACKGROUND

A cryostat is a device employed to achieve and maintain low cryogenic temperatures. Existing techniques for rapidly cooling internal vacuum spaces within a cryostat can include use of a multiple cryogenic sections with a common vacuum space of the cryostat. The plurality of thermal stages presented by the multiple cryogenic sections can be disposed between a 4-Kelvin (K) stage (e.g., to be lowered to about 4K) and a cold plate stage. A thermal switch can be employed within the cryostat to provide a switchable thermal path between the intermediate thermal stage and the adjacent thermal stage. Yet, cooling by existing pulse tube systems, with or without compressors, is still exceedingly timely, such as in the range of 1 to 2 days. The pulse tube systems also cause pulse vibrations to reverberate through the cryostat, disturbing the delicate systems therewithin. In addition, heating a cryostat to thereby break the internal vacuum can likewise be very timely. Thus, any need to fix, perform maintenance and/or modify an internal setup can cause a downtime of days. This can be undesirable and/or unacceptable.

SUMMARY

The following presents a summary to provide a basic understanding of one or more embodiments described herein. This summary is not intended to identify key or critical elements, delineate scope of embodiments or scope of claims. Its sole purpose is to present concepts in a simplified form as a prelude to the more detailed description that is presented later. In one or more embodiments described herein, systems, methods and/or apparatuses can facilitate a process to cool one or more components located within a cryostat.

In accordance with one or more embodiments, a system can comprise a cryostat having a cooling plate disposed within the cryostat, and a cooling feed line extending into the cryostat from external to the cryostat, which cooling feed line is thermally coupled to the cooling plate by a heat exchanger.

In accordance with another embodiment, a system can comprise cryostat having a primary cooling feed line extending into the cryostat, which primary cooling feed line is both physically coupled and thermally coupled to a cold plate within the cryostat by a heat exchanger, a bulk cooling system employing a liquifiable gas to provide cooling, and a main cooling feed line fluidly coupled to the bulk cooling system and to the primary cooling feedline.

In accordance with still another embodiment, a method for operating a cryostat can comprise pumping, by a system operatively coupled to a processor, a gas from a bulk cooling system, employing a liquifiable gas to provide cooling, through a cooling feed line entering a cryostat, and cooling, by the system, the cooling plate within the cryostat by the gas flowing from the bulk cooling system, wherein the cooling feed line is thermally coupled to the cooling plate.

An advantage of the above-mentioned systems and/or method can be non-use of an existing pulse tube system and thus prevention of affect of components internal to the cryostat by pulse vibrations emanating from such pulse tube system. This likewise can allow for additional space/real estate for I/O lines and/or cry-components within a cryostat.

Another advantage of the above-mentioned systems and/or method can be more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

In one or more embodiments of the above-mentioned systems and/or method, the system further can comprise a bulk cooling system that employs a liquifiable gas to provide cooling, wherein the bulk cooling system is fluidly coupled to the cooling feed line.

An advantage of the above-mentioned systems and/or method can be the use of a bulk cooling system with pumps physically separate from the cryostat can allow for decrease in cooling time for the cryostat while also reducing the affect of any machine vibration from the bulk cooling system on the cryostat.

In one or more embodiments of the above-mentioned systems and/or method, the system can further comprise a second bulk cooling system that employs a liquifiable gas for cooling of the cryostat, which second bulk cooling system is fluidly coupled to the second cooling feed line, wherein the cooling feed line is coupled to a heat exchanger at the cooling plate, and wherein the second cooling feed line is coupled to a second heat exchanger at the second cooling plate.

An advantage of the above-mentioned systems and/or method can be that more than one bulk cooling system can be employed to cool the cryostat, such as to cool different internal compartments of the vacuum chamber to different temperatures. This can allow for even more rapid decrease in cooling time, such as where one bulk cooling system using a first liquifiable gas can be used to drop an internal temperature within the cryostat to a first temperature that is higher than a second temperature achievable by a second bulk cooling system using a second liquifiable gas (different from the first liquifiable gas).

In one or more embodiments of the above-mentioned systems and/or method, a vacuum pump can be disposed at the cooling return line and external to the cryostat and physically decoupled from the cryostat by a section of the cooling return line disposed between the cryostat and the vacuum pump.

An advantage of the above-mentioned systems and/or method can be a reduction in any machine vibration from affecting internal aspects of the cryostat. Use of the vacuum pump can allow for even more rapid decrease in cooling time, and further can allow for an even lower cooling temperature. This advantage in itself can allow for more rapid cooling of a most internal section of the cryostat by requiring less of the dilution refrigerator (also herein referred to as a dilution refrigeration unit) for cooling such most internal section. That is, a temperature at which a dilution refrigerator can be switched on can be lower than as with existing cryostat frameworks.

DETAILED DESCRIPTION

Figure 1:
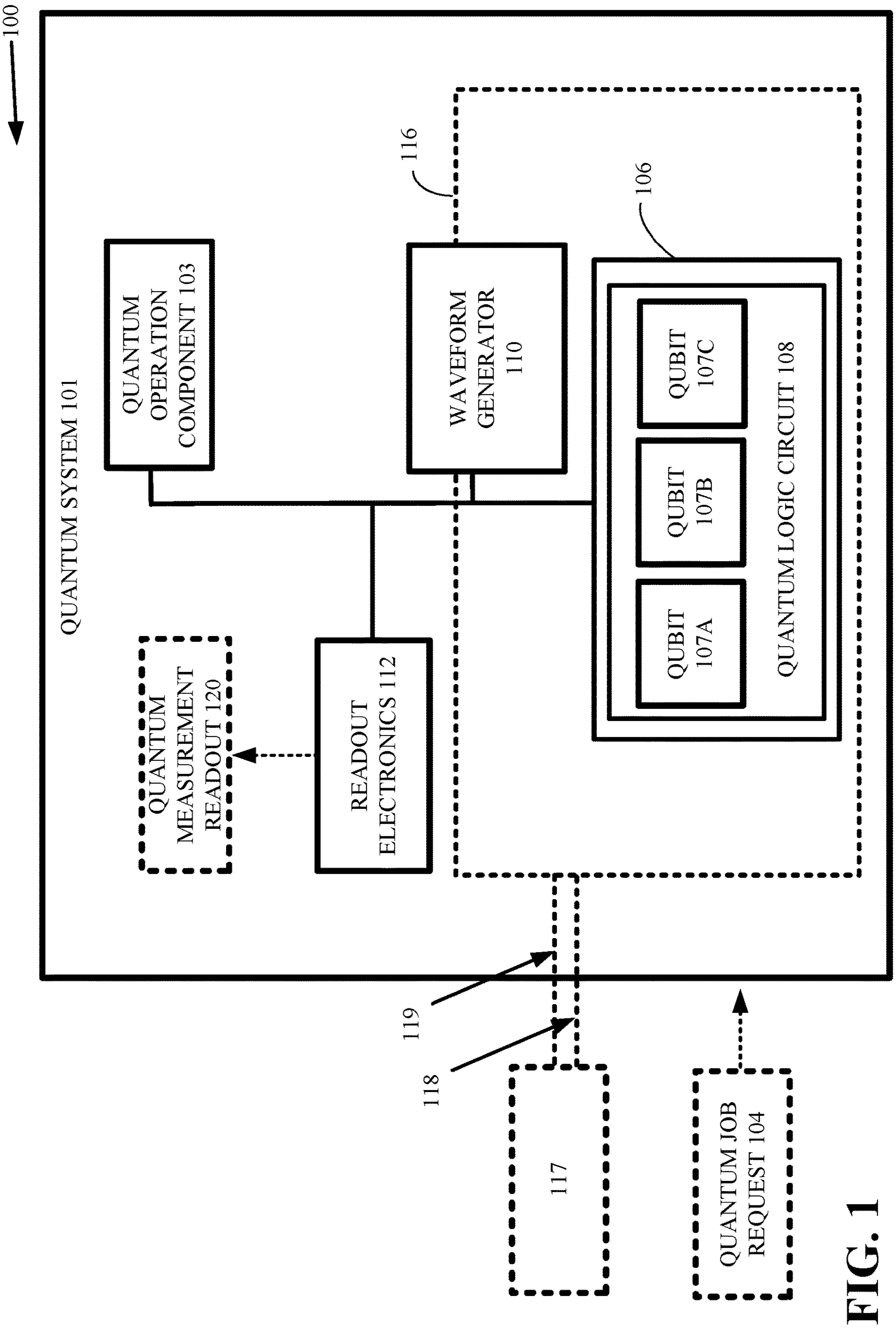
FIG. 1 illustrates a block diagram of an example, non-limiting system that can facilitate measurement readout from one or more qubits, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section or in the Detailed Description section. One or more embodiments are now described with reference to the drawings, wherein like reference numerals are utilized to refer to like elements throughout. In the following description, for purposes of explanation, numerous details are set forth in order to provide a more thorough understanding of the one or more embodiments. However, in various cases, that the one or more embodiments can be practiced without these details.

Discussion is provided herein relative to a configuration of a system (e.g., comprising and/or comprised by a cryostat) that can be employed at a quantum system for lowering components internal to the cryostat to extremely low temperatures, such as mK temperatures. Such cryostat also can have use with nuclear magnetic resonance experiments and/or ion cyclotron resonance, among other uses. Description and discussion herein are therefore not limited to use with a quantum system or in the quantum domain only.

Turning first to existing cryostat frameworks, such frameworks can comprise multiple cryogenic sections with a common vacuum space of the cryostat. The plurality of thermal stages presented by the multiple cryogenic sections can be disposed between a 4-Kelvin (K) stage (e.g., to be lowered to about 4K) and a cold plate stage. The plurality of thermal stages can include a still plate stage and an intermediate thermal plate stage that can be directly coupled mechanically to the still plate stage via a support rod. A thermal switch can facilitate modifying a thermal profile of the cryostat by providing a switchable thermal path between the intermediate thermal stage and the adjacent thermal stage.

However, this method still can take undesirably long, such as in a range of 18 hours to 38 hours or more, and bringing the system back to temperature to allow for breaking the vacuum of the cryostat can also take undesirably long. Relative to use of the cryostat at a quantum system, such long cool-down and warm-up times can be directly associated with loss of valuable quantum computing time.

With such existing cryostat frameworks, this long timing deficiency is coupled with damage and/or interruption that is caused by pulse vibrations reverberating through the cryostat from each pulse of pulse tube systems used to cool the existing cryostats. These vibrations can be due to the pulse tube systems being physically coupled to the cryostat by extending from external to the cryostat to internal to the cryostat. One or more frameworks can comprise flexible members to couple the pulse tube systems, but vibration still can be passed to the cryostat from these flexible members. Relative to a quantum system employing such existing cryostat framework, the delicate physical qubit components can be shifted and/or damaged by the vibrations.

To account for one or more of these deficiencies of existing frameworks, one or more embodiments described herein can provide rapid cooling, rapid warming and/or more efficient maintenance of a cryostat, as compared to existing cryostat frameworks.

Generally, a system described herein can comprise a cryostat and a cooling system for the cryostat. The cooling system can comprise a bulk cooling system that can employ a liquifiable gas for cooling the cryostat by one or more supply lines and one or more return lines. The cryostat can comprise an outer shield and an outer plate with one or more additional plates supported relative to one another within a vacuum chamber provided by at least the outer shield and the outer plate. One or more of the additional plates (also referred to as plate stages) can at least partially define an internal compartment within the vacuum chamber.

Use of a bulk cooling system with pumps physically separate from the cryostat can allow for decrease in cooling time for the cryostat while also reducing the affect of any machine vibration from the bulk cooling system on the cryostat.

In one or more embodiments, more than one bulk cooling system can be employed to cool the cryostat, such as to cool different internal compartments of the vacuum chamber to different temperatures. This can allow for even more rapid decrease in cooling time, such as where one bulk cooling system using a first liquifiable gas can be used to drop an internal temperature within the cryostat to a first temperature that is higher than a second temperature achievable by a second bulk cooling system using a second liquifiable gas (different from the first liquifiable gas).

In one or more embodiments, a pump, such as a vacuum pump, can draw on a return line from within the cryostat. The vacuum pump can be physically separated from the cryostat to reduce any machine vibration from affecting internal aspects of the cryostat. Use of the vacuum pump can allow for even more rapid decrease in cooling time, and further can allow for an even lower cooling temperature. This advantage in itself can allow for more rapid cooling of a most internal section of the cryostat by requiring less of the dilution refrigerator for cooling such most internal section. That is, a temperature at which a dilution refrigerator can be switched on can be lower than as with existing cryostat frameworks.

Accordingly, in use, the one or more frameworks discussed herein can allow for more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

As used herein, the term "on" and "above" can be used in a context, as is customary, to indicate orientation or relative position in a vertical or orthogonal direction to the surface of the substrate, for example in a vertical z-direction.

As used herein, the term "lateral" and/or "laterally" can be used, as is customary, to indicate orientation generally parallel to the plane of the substrate, as opposed to generally vertically or outwardly, from the substrate surface.

As used herein, the term "vertical" and/or "vertically" can be used, as is customary, to indicate orientation generally orthogonal (e.g., vertical z-direction) to the plane of the substrate, and thus also in a direction outward from the plane of the substrate, as opposed to generally laterally along the substrate surface.

As used herein, the term "arranged on/at" can be understood in a broad sense and shall include embodiments according to which an intermediate layer, such as an insulating layer, can be arranged between a substrate/ground plane/ground and a respectively described layer/structure. Hence the terms "arranged on" and/or "arranged at" can comprise the meaning of "arranged above".

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous details are set forth in order to provide a more thorough understanding of the one or more embodiments. However, in various cases, that the one or more embodiments can be practiced without these details.

Generally, the subject computer processing system, methods, apparatuses, devices and/or computer program products can be employed to solve new problems that can arise through advancements in technology, computer networks, the Internet and the like.

Further, the one or more embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Turning first generally to FIG. 1, one or more embodiments described herein can include one or more devices, systems and/or apparatuses that can facilitate executing one or more operations to facilitate generation of one or more qubit drive, excitation and/or readout pulses (e.g., signals, waveforms and/or wavelets). FIG. 1 illustrates a block diagram of an example, non-limiting system 100 that can facilitate operation of a quantum circuit such as by employing a non-limiting system 117 according to the present disclosure. The non-limiting system 117 can be employed at an input to the quantum system 101 (e.g., a fluidic, gas and/or liquid input) and/or at any other suitable location internal to and/or external to the quantum system 101.

The following/aforementioned description refer to the operation of a single quantum program from a single quantum job request. This operation can include one or more readouts from cryogenic environment electronics within cryogenic chamber 116 (such as provided by a cryostat) by room temperature control/readout electronics 112 external to the cryogenic chamber 116. That is, one or more of the processes described herein can be scalable, also such as including additionally, and/or alternatively, execution of one or more quantum programs and/or quantum job requests in parallel with one another. Scalability can be enabled by employing electronic structures as described herein in quantity.

In one or more embodiments, the non-limiting system 100 can be a hybrid system and thus can include one or more classical systems, such as a quantum program implementation system, and/or one or more quantum systems, such as the quantum system 101. In one or more other embodiments, the quantum system 101 can be separate from, but function at least partially in parallel with, a classical system.

In such case, one or more communications between one or more components of the non-limiting system 100 and a classical system can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 8LoWPAN (Ipv8 over Low power Wireless Area Networks), Z-Wave, an ANT, an ultra-wideband (UWB) standard protocol and/or other proprietary and/or non-proprietary communication protocols.

In one or more other embodiments, the classical system can provide a quantum job request 104, qubit mapping and/or quantum circuit to be executed. Such classical system can analyze the one or more quantum measurement readouts 120. Further, such classical system can manage a queueing of quantum circuits to be operated on the one or more qubits of the quantum logic circuit of a respective quantum system 101.

Figure 11:
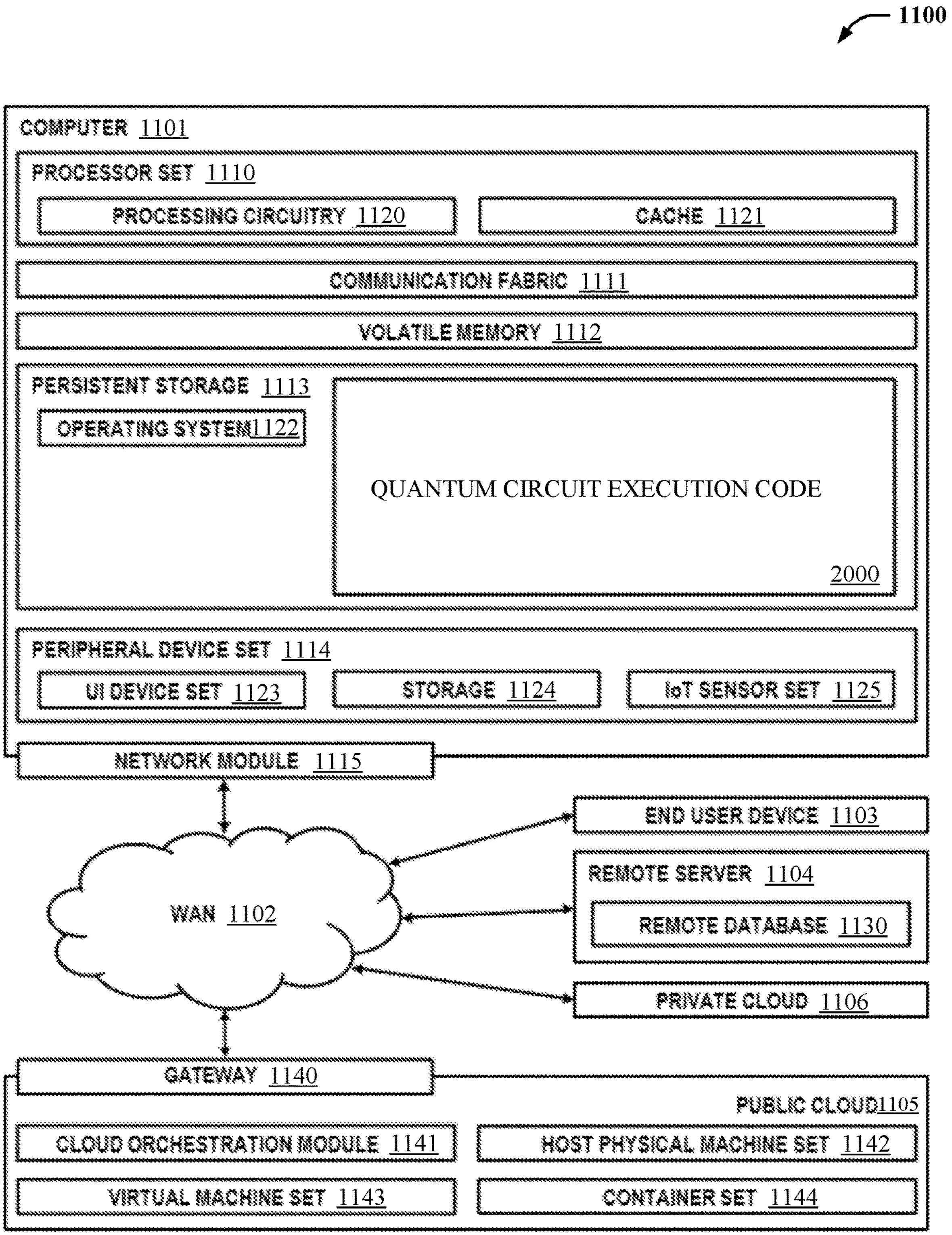
FIG. 11 illustrates a block diagram of example, non-limiting, computer environment in accordance with one or more embodiments described herein.

For example, in one or more embodiments, the non-limiting systems described herein, such as non-limiting system 100 as illustrated at FIGS. 1, and/or systems thereof, can further comprise, be associated with and/or be coupled to one or more computer and/or computing-based elements described herein with reference to an operating environment, such as the operating environment 1100 illustrated at FIG. 11. In one or more described embodiments, computer and/or computing-based elements can be used in connection with implementing one or more of the systems, devices, components and/or computer-implemented operations shown and/or described in connection with FIG. 1 and/or with other figures described herein.

The quantum system 101 (e.g., quantum computer system and/or superconducting quantum computer system) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 120, can be responsive to the quantum job request 104 and associated input data and can be based at least in part on the input data, quantum functions and/or quantum computations.

As used herein, a quantum circuit can be a set of operations, such as gates, performed on a set of real-world physical qubits with the purpose of obtaining one or more qubit measurements. A quantum processor can comprise the one or more real-world physical qubits. Operation of a quantum circuit can be facilitated, such as by a waveform generator 110, to produce one or more physical pulses and/or other waveforms, signals and/or frequencies to alter one or more states of one or more of the physical qubits. The altered states can be measured, thus allowing for one or more computations to be performed regarding the qubits and/or the respective altered states. The waveform generator can be controlled, such as by a respective control stage.

In one or more embodiments, the quantum system 101 can comprise one or more quantum components, such as a quantum operation component 103, a quantum processor 106, quantum room temperature readout/control electronics 112, the waveform generator 110, and/or a quantum logic circuit 108 comprising one or more qubits (e.g., qubits 107A, 107B and/or 107C), also referred to herein as qubit devices 107A, 107B and 107C.

The quantum processor 106 can be any suitable processor. The quantum processor 106 can generate one or more instructions for controlling the one or more processes of the quantum logic circuit 108 and/or waveform generator 110.

The quantum operation component 103 can obtain (e.g., download, receive and/or search for) a quantum job request 104 requesting execution of one or more quantum programs. The quantum operation component 103 can determine one or more quantum logic circuits, such as the quantum logic circuit 108, for executing the quantum program. The request 104 can be provided in any suitable format, such as a text format, binary format and/or another suitable format. In one or more embodiments, the request 104 can be received by a component other than a component of the quantum system 101, such as a by a component of a classical system coupled to and/or in communication with the quantum system 101.

The waveform generator 110 can perform one or more waveform for operating and/or affecting one or more quantum circuits on the one or more qubits 107A, 107B and/or 107C. For example, the waveform generator 110 can operate one or more qubit effectors, such as qubit oscillators, harmonic oscillators and/or pulse generators to cause one or more pulses to stimulate and/or manipulate the state of the one or more qubits 107A. 107B and/or 107C comprised by the quantum system 101.

One or more physical qubit components (e.g., of the one or more qubits 107A, 107B and/or 107C) can be retained in a stable and static position relative to one another and/or relative to waveform generator electronics, at room temperatures, cryogenic temperatures (e.g., in the milli Kelvin range) and/or temperatures therebetween. As used herein, room temperature can be between 80 degrees Fahrenheit and 80 degrees Fahrenheit, such as about 70 degrees Fahrenheit.

The waveform generator 110, such as at least partially in parallel with the quantum processor 106, can execute operation of a quantum logic circuit on one or more qubits of the circuit (e.g., qubit 107A, 107B and/or 107C). In response, the quantum operation component 103 can output one or more quantum job results, such as one or more quantum measurements 120, in response to the quantum job request 104.

The quantum logic circuit 108 and a portion or all of the waveform generator 110 and/or quantum processor 106 can be contained in a cryogenic environment, such as generated by a cryogenic chamber 116, such as provided by a cryostat. Indeed, a signal can be generated by the waveform generator 110 within the cryogenic chamber 116 to affect the one or more qubits 107A-C. Where qubits 107A, 107B and 107C are superconducting qubits, cryogenic temperatures, such as about 4K or lower can be employed to facilitate function of these physical qubits. Accordingly, the elements of the waveform generator 110 also are to be constructed to perform at such cryogenic temperatures.

The cryogenic chamber 116 can be cooled, such as employing a bulk cooling system of the non-limiting system 117. The non-limiting system 117 further can comprise one or more supply lines 118 and one or more return lines 119 for supplying gas, liquid, liquifiable gas and/or a combination thereof to one or more conduits within and/or disposed about the cryogenic chamber 116. For example, the cryogenic chamber 116 can be comprised by an internal section of a cryostat with a supply line 118 and a return line 119 extending into/out of the cryostat and being at least partially internal to or external to the internal section of the cryostat comprising a plate having located thereat the quantum logic circuit 108.

The non-limiting system 117 can be at least partially controlled by a processor, such as of the quantum system 101, and/or by the quantum operation component 103, which likewise can be comprised by a processor of the quantum system 101. Such processor can be any suitable processor. Discussion proved below with respect to processor 1110 can be at least partially equally applicable to such processor.

Turning now to FIGS. 2-9, illustrated are views of varying embodiments of non-limiting systems (e.g., cryogenic cooling systems) comprising a cryostat and a bulk cooling system. Any one or more of these non-limiting systems described below can be employed as and/or in conjunction with the non-limiting system 117 and associated cryostat (e.g., providing the cryogenic chamber 116) of FIG. 1.

Generally, each of the electronic structures discussed herein comprises a substrate, such as a laminate and/or circuit board, a resonator assembly and an optical pump waveguide that receives an optical input (e.g., laser input) from an optical pump or other source of light. As described below, the optical pump can be separate from the electronic structures. However, in one or more embodiments, an electronic structure as described herein further can include a respective optical pump.

It is appreciated that each electronic structure embodiment described below can comprise different aspects from one or more other embodiments and that one or more teachings described relative to any one electronic structure embodiment can be applied to any one or more other electronic structure embodiments.

It is appreciated that the figures referenced provide but single illustrations of electronic structures. Thus, in use, an electronic structure described can be scalable to include one or more additional or fewer components, component shapes, component locations and/or component dimensions.

Furthermore, any two or more of the embodiments described herein can be used at least partially in parallel with one another. For example, an electronic structure of the non-limiting system 200 can be employed at a same system (e.g., at least partially quantum-based system) as any one or more of the electronic structures of the non-limiting systems 400, 600 and/or 800, and indeed can be at least optically coupled to any one or more of the electronic structures of any one of the non-limiting systems 400, 600 and/or 800 to allow for transmission therebetween.

Figure 2:
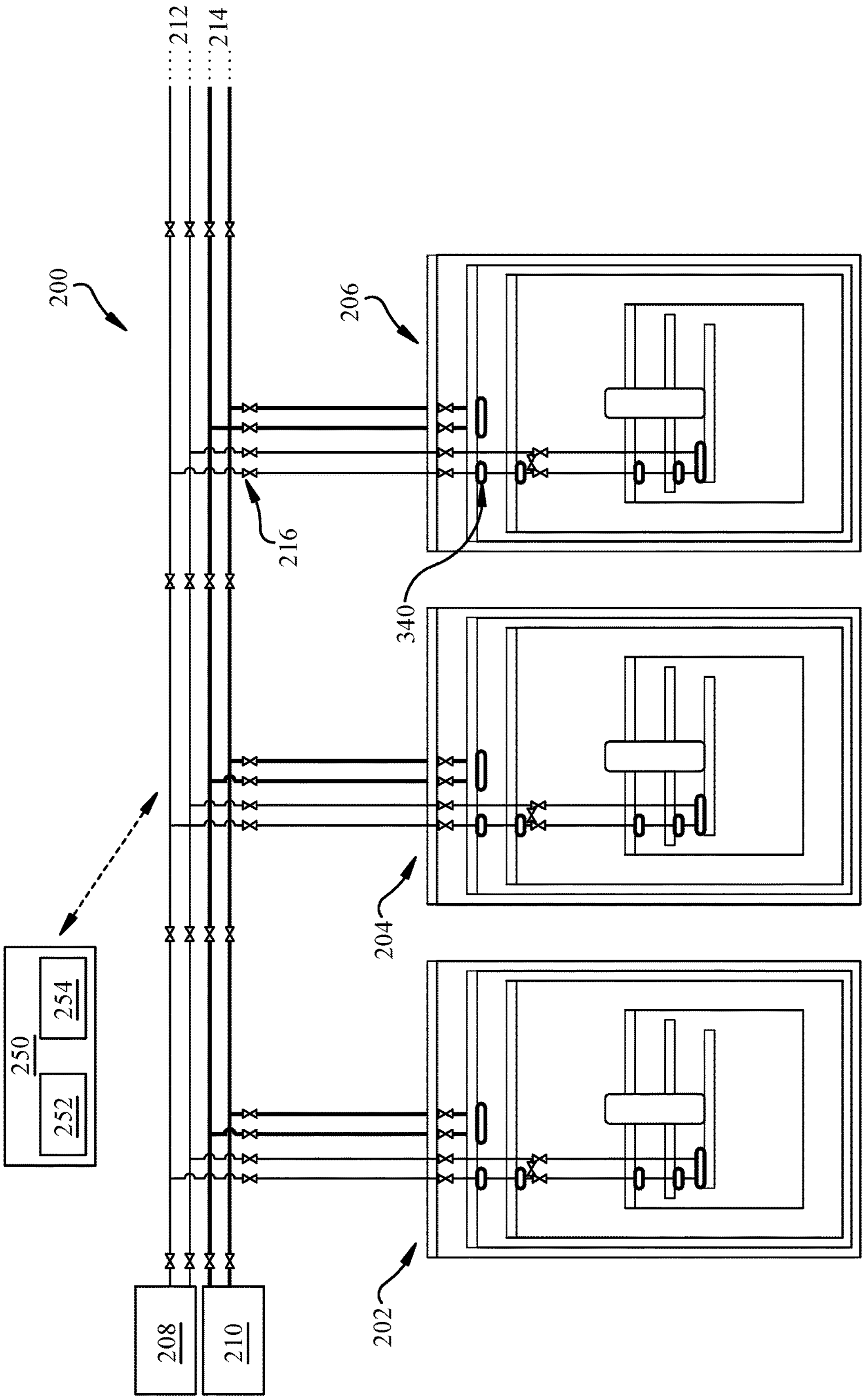
FIG. 2 illustrates a cryostat system, in accordance with one or more embodiments described herein.

Turning first to FIG. 2 and to the non-limiting system 200, but applicable to any non-limiting system described herein (e.g., non-limiting systems 400, 600 and/or 800), such non-limiting system 200 can comprise and/or be associated with a control sub-system 250. The control sub-system can comprise at least a processor 252 and a memory 254. The memory 254 can function with and be operably connected to the processor 252. The processor 252 can execute one or more computer-readable instructions, such as from the memory 254, to perform one or more operations related to operation of the non-limiting system 200. For example, one or more such computer-readable instructions can allow for operation of one or more valves, vacuum pumps, liquifiable gas farms and/or dilution refrigerators of one or more cryostats of the non-limiting system 200, the functions of which will be described below.

Discussion below relative to the processor set 1110 can be applicable to the processor 252. Likewise, discussion below relative to the persistent storage 1113 and/or volatile memory 1112 can be applicable to the memory 254.

Figure 3:
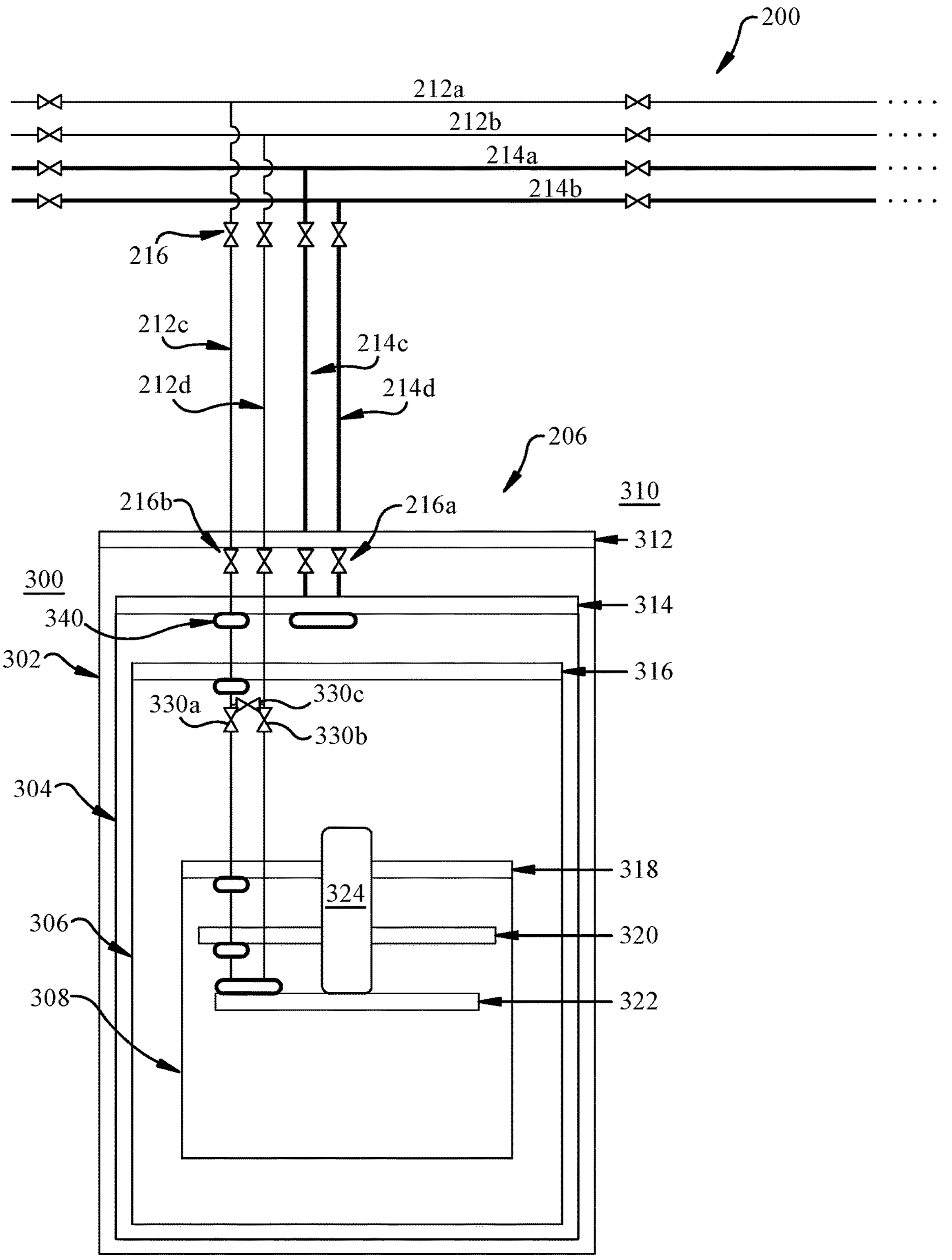
FIG. 3 illustrates another view of the cryostat system of FIG. 2, in accordance with one or more embodiments described herein.

Turning next to FIGS. 2 and 3, the non-limiting system 200 can comprise one or more bulk cooling systems 208 and/or 210 (also herein referred to as liquifiable gas farms) that can employ and provide a liquifiable gas to cool a cryostat. The bulk cooling systems 208 and 210 can provide different and/or same liquifiable gases. Each bulk cooling system 208 and 210 can be fluidly coupled to one or more cryostats, such as to all cryostats, of the non-limiting system 200.

The non-limiting system 200 also can comprise one or more such cryostats 202, 204 and/or 206 These cryostats can be similar to and/or different from one another, such as having different numbers of plates, internal thermally insulated sections and/or internal components. Certainly, each cryostat can have different internal components at the most internal stages of such cryostats.

A first set of supply and return lines 212 can supply a first liquifiable gas from the first bulk cooling system 208 to one or more of the cryostats 202, 204 and/or 206. The supply line can provide a cooled liquifiable gas from the first bulk cooling system 208 to the one or more cryostats and the return line can take warmed gas from the one or more cryostats back to the first bulk cooling system 208 for re-cooling. A primary set of feed and return lines can extend from and fluidly couple the first set of supply and return lines 212 and the one or more cryostats.

A second set of supply and return lines 214 can supply a second liquifiable gas from the second bulk cooling system 210 to one or more of the cryostats 202, 204 and/or 206. The supply line can provide a cooled liquifiable gas from the second bulk cooling system 210 to the one or more cryostats and the return line can take warmed gas from the one or more cryostats back to the second bulk cooling system 210 for re-cooling. An auxiliary set of feed and return lines can extend from and fluidly couple the second set of supply and return lines 214 and the one or more cryostats.

Each of the first set of supply and return lines 212, the second set of supply and return lines 214, the primary feed and return lines and the auxiliary feed and return lines can comprise one or more valves 216. One or more of such valves 216 can be internal to a cryostat of the one or more cryostats.

As illustrated, each of the cryostats 202, 204 and/or 206 can comprise a plurality of plates that together with a plurality of external and internal shields can define a plurality of internal thermally insulated sections. Where a first internal thermally insulated section is internal to a second internal thermally insulated section, the second internal thermally insulated section can be at least partially thermally insulated to, and retain a cooler temperature than, the first internal thermally insulated section.

Turning now to FIG. 3, the cryostat 206 is illustrated separately from the other cryostats 202 and 204 to provide greater illustration of one cryostat of the non-limiting system 200. As illustrated, a supply line 212*a* can be fluidly coupled to the cryostat 206 by a primary feed line 212*c*, a return line 212*b* can be fluidly coupled to the cryostat 206 by a primary return line 212*d*, a supply line 214*a* can be fluidly coupled to the cryostat 206 by an auxiliary feed line 214*c*, and a return line 214*b* can be fluidly coupled to the cryostat 206 by an auxiliary return line 214*d*. Also as illustrated, the primary feed line 212*c* and primary return line 212*d* extend deeper and more internal to the cryostat 206 than the auxiliary feed line 214*c* and auxiliary return line 214*d*.

One or more valves 216 allow for transmission of liquifiable gas at the various supply, return and feed lines at times that can be different from and/or at least partially parallel to one another.

A set of plates 310 and a set of external and internal shields 300 define a plurality of internal thermally insulated sections (e.g., heat-shielded sections) of the cryostat 206. Suitable materials for the set of plates 310 can comprise stainless steel for the room temperature first plate 312, aluminum for the second plate 314 and copper for the remaining plates of the set of plates 310. Suitable materials for the external shield 302 can comprise stainless steel, for the first internal shield 304 can comprise aluminium, and for the remaining internal shields of the set of external and internal shields 300 can comprise copper.

At least one heat exchanger 340 can by physically coupled to each plate of the set of plates 310 that is intended to be cooled by the respective primary and/or auxiliary feed line. In one example, a heat exchanger can comprise a plurality of interconnected pathways (e.g., maze, spiral and/or serpentine) for allowing increased heat transfer from the respective plate to the respective cooled liquifiable gas that is running through the respective heat exchanger 340. Suitable materials for the heat exchangers 340 can comprise copper, silver, gold and/or platinum.

As illustrated, the set of plates 310 can comprise a room temperature first plate 312 (e.g., external plate), a second plate 314, third plate 318, fourth plate (e.g., still plate) 318, fifth plate 320 (e.g., cold plate) and sixth plate 322 (e.g., mixing chamber plate). Each of the fifth plate 320 (e.g., cold plate) and the sixth plate 322 (e.g., mixing chamber plate) can have physically coupled thereto quantum components such as components comprising and/or comprised by physical qubits of a quantum system.

A first internal section can be defined by the room temperature first plate 312 and the external shield 302. Internal thereto, a second internal section can be defined by the second plate 314 and the first internal shield 304. Internal thereto, a third internal section can be defined by the third plate 318 and the second internal shield 306. Internal thereto a fourth internal section can be defined by the third plate 318

(e.g., still plate) and a third internal shield 308, which fourth internal section can at least partially house a dilution refrigerator 324.

As shown, each of the second plate 314, third plate 318, third plate 318 (e.g., still plate), fifth plate 320 (e.g., cold plate) and sixth plate 322 (e.g., mixing chamber plate) can be cooled by the first bulk cooling system 208 in view of the primary feed line 212*c* being fluidly coupled to a respective heat exchanger 340 that is physically coupled to a respective one of these plates. Also as shown, the second plate 314 can be cooled by the second bulk cooling system 210 in view of the auxiliary feed line 214*c* being fluidly coupled to a respective heat exchanger 340 that is physically coupled to the second plate 314.

One or more, such as all, of the third plate 318 (e.g., still plate), fifth plate 320 (e.g., cold plate) and/or sixth plate 322 (e.g., mixing chamber plate) can be further cooled by the dilution refrigerator 324 (e.g., dil. fridge) as known to one having ordinary skill in the art.

The valves, pumps and bulk cooling systems discussed above can be configured to allow for each more-internally-located plate to reach a cooler temperature than each less-internally-located plate. For example, the aforedescribed configuration can comprise the first bulk cooling system 208 being a liquid helium bulk cooling system and the second bulk cooling system 210 being a liquid nitrogen bulk cooling system. In one or more other embodiments, the first or second bulk cooling system instead can supply liquid xenon, liquid oxygen and/or liquid neon.

In use, the aforedescribed configuration can allow for cooling of the second plate 314 to about 75K to about 80K, cooling of the third plate 318 to about 4.2K to about 10K, cooling of the third plate 318 (e.g., still plate) to about 0.5K to about 1K, cooling of the fifth plate 320 (e.g., cold plate) to about 0.1K, and cooling of the mixing chamber plate to about 0.005K to about 0.008K (e.g., in the mK range).

For example, in use, the liquid nitrogen second bulk cooling system 210 can be employed to first lower the second plate 314 and all plates below the second plate 314 (e.g., third plate 318, third plate 318 (e.g., still plate), fifth plate 320 (e.g., cold plate) and sixth plate 322 (e.g., mixing chamber plate) to about 75K to about 80K from room temperature, after the cryostat is vacuum sealed. In one or more embodiments, the temperature can be about 77K.

Next, the liquid helium bulk cooling system 208 can be employed to drop the second plate 314 and the third plate 318 to their aforementioned respective temperatures, with the third plate 318 (e.g., still plate), fifth plate 320 (e.g., cold plate) and sixth plate 322 (e.g., mixing chamber plate) below the third plate 318 also being dropped to about 4.2K to about 10K. It will be appreciated that one or more sensors internal to the cryostat 206 can be employed to make such determination as to whether the 75K to 80K temperature has been reached, which one or more sensors can be operably coupled to at least the processor 252, and which can be employed for determining when to start any next cooling cycle as described herein. The valves 216*a* can remain open and liquifiable gas can continue to run through these valves 216*a* via the bulk cooling system 210 during the operation of the bulk cooling system 208 pumping liquifiable cooling gas through the valves 216*b*.

By operation of the dilution refrigerator 324, the third plate 318 (e.g., still plate), fifth plate 320 (e.g., cold plate) and sixth plate 322 (e.g., mixing chamber plate) can be allowed to reach their respective cooling temperatures. For the sixth plate 322 (e.g., mixing chamber plate), this can be about 0.005K to about 0.05K, such as about 0.008K. During operation of the dilution refrigerator 324, the valves 330*a* and 330*b* can be closed, and bypass valve 330*c* can allow for continued circulation of a liquifiable gas from the bulk cooling system 208 through the valves 216*b*.

It is noted that one or more additional valves, primary feed lines and/or primary return lines can be employed in one or more other embodiments.

As a result of the aforementioned process and non-limiting system 200, the cryostat 206 can be efficiently cooled (e.g., the sixth plate 322 (e.g., mixing chamber plate) can reach a temperature in the mK range) in a much more rapid time than with existing cryostat frameworks. To open the cryostat 206, any of the aforementioned supply, return and/or feed lines can be suitable fluidly coupled to a warm gas supply system for more rapidly heating up an internal temperature of the cryostat 206 than with existing cryostat frameworks. That is, an advantage of the above-mentioned systems and/or method can be more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

Figure 4:
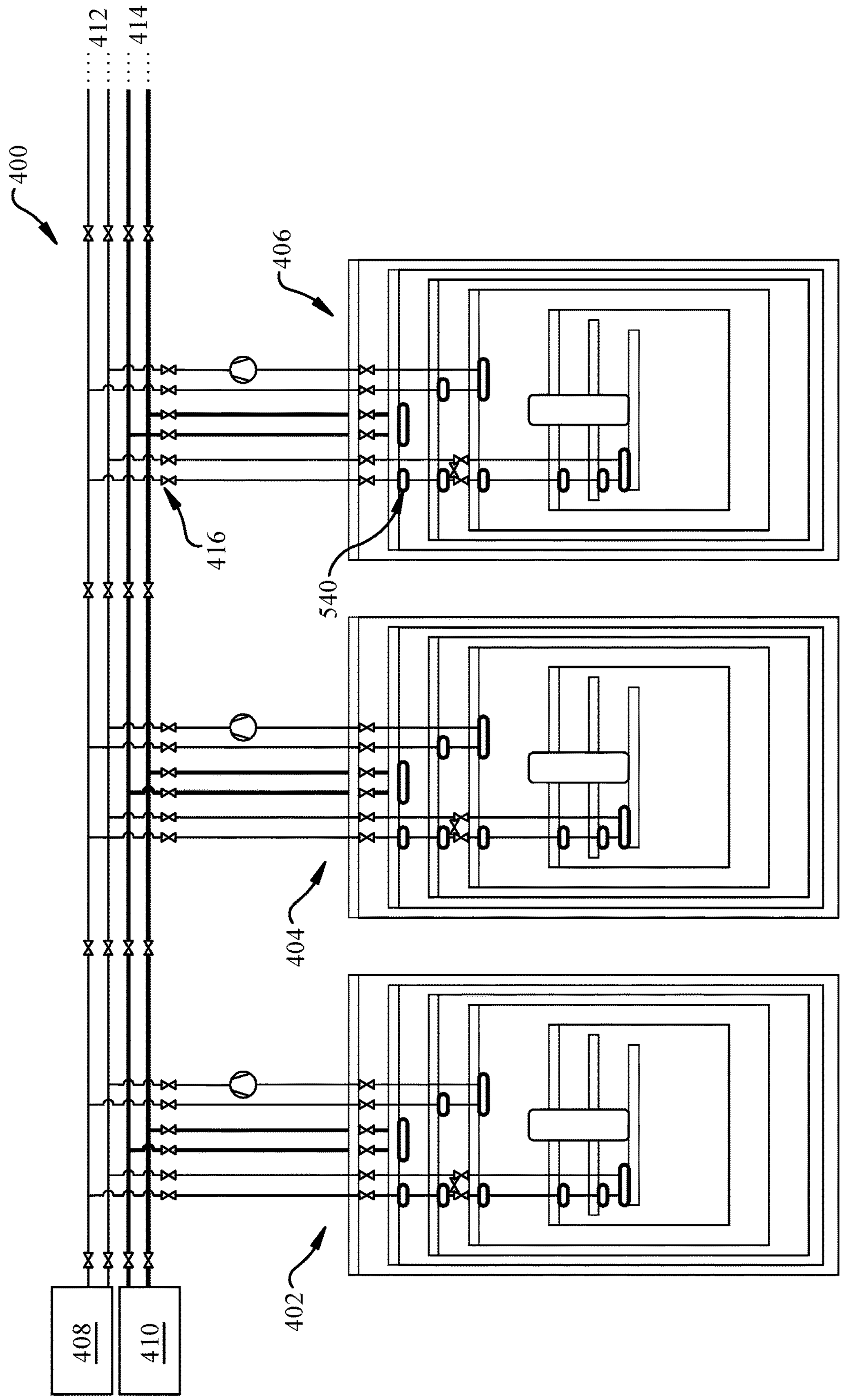
FIG. 4 illustrates a cryostat system, in accordance with one or more embodiments described herein.
Figure 5:
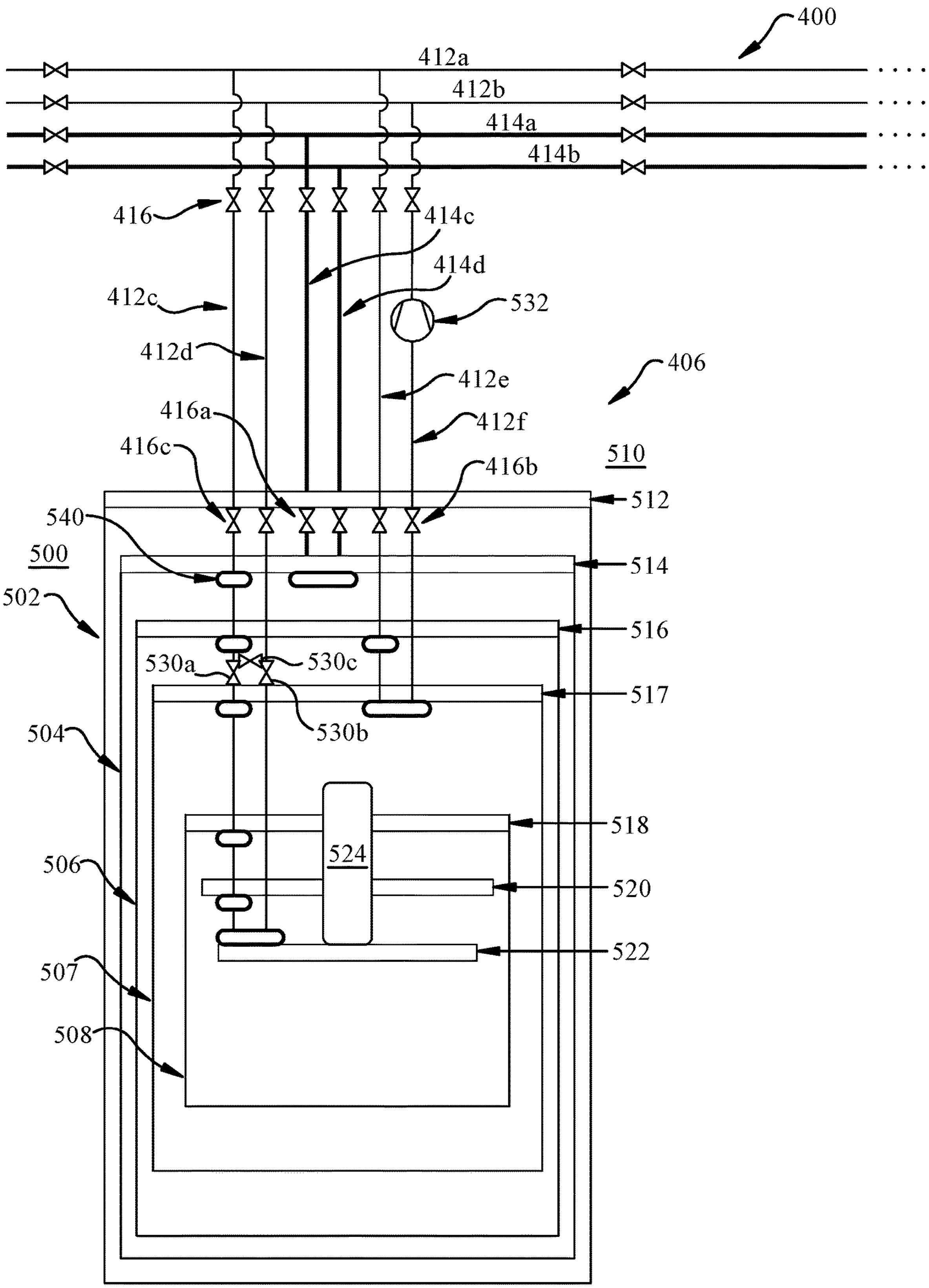
FIG. 5 illustrates another view of the cryostat system of FIG. 4, in accordance with one or more embodiments described herein.

Turning next to FIGS. 4 and 5, the non-limiting system 400 can comprise one or more bulk cooling systems 408 and/or 410 (also herein referred to as liquifiable gas farms) that can employ and provide a liquifiable gas to cool a cryostat. The bulk cooling systems 408 and 410 can provide different and/or same liquifiable gases. Each bulk cooling system 408 and 410 can be fluidly coupled to one or more cryostats, such as to all cryostats, of the non-limiting system 400.

The non-limiting system 400 also can comprise one or more such cryostats 402, 404 and/or 406. These cryostats can be similar to and/or different from one another, such as having different numbers of plates, internal thermally insulated sections and/or internal components. Certainly, each cryostat can have different internal components at the most internal stages of such cryostats.

A first set of supply and return lines 412 can supply a first liquifiable gas from the first bulk cooling system 408 to one or more of the cryostats 402, 404 and/or 406. The supply line can provide a cooled liquifiable gas from the first bulk cooling system 408 to the one or more cryostats and the return line can take warmed gas from the one or more cryostats back to the first bulk cooling system 408 for re-cooling. A primary set of feed and return lines can extend from and fluidly couple the first set of supply and return lines 412 and the one or more cryostats.

A second set of supply and return lines 414 can supply a second liquifiable gas from the second bulk cooling system 410 to one or more of the cryostats 402, 404 and/or 406. The supply line can provide a cooled liquifiable gas from the second bulk cooling system 410 to the one or more cryostats and the return line can take warmed gas from the one or more cryostats back to the second bulk cooling system 410 for re-cooling. An auxiliary set of feed and return lines can extend from and fluidly couple the second set of supply and return lines 414 and the one or more cryostats.

Each of the first set of supply and return lines 412, the second set of supply and return lines 414, the primary feed and return lines and the auxiliary feed and return lines can comprise one or more valves 416. One or more of such valves 416 can be internal to a cryostat of the one or more cryostats.

As illustrated, each of the cryostats 402, 404 and/or 406 can comprise a plurality of plates that together with a plurality of external and internal shields can define a plurality of internal thermally insulated sections. Where a first internal thermally insulated section is internal to a second internal thermally insulated section, the second internal thermally insulated section can be at least partially thermally insulated to, and retain a cooler temperature than, the first internal thermally insulated section.

Turning now to FIG. 3, the cryostat 406 is illustrated separately from the other cryostats 402 and 404 to provide greater illustration of one cryostat of the non-limiting system 400. As illustrated, the first bulk cooling system 408 can be fluidly coupled to the cryostat 406 by a first primary feed line 412*c* and first primary return line 412*d* and by a second primary feed line 412*e* and second primary return line 412*f*. The second bulk cooling system 410 can be fluidly coupled to the cryostat 406 by an auxiliary set of an auxiliary feed line 414*c* and auxiliary return line 414*d*. Further, a vacuum pump 532 can be fluidly coupled to the second primary return line 412*f*.

One or more valves 416 allow for transmission of liquifiable gas at the various supply, return and feed lines at times that can be different from and/or at least partially parallel to one another.

A set of plates 510 and a set of external and internal shields 500 define a plurality of internal thermally insulated sections (e.g., heat-shielded sections) of the cryostat 406. Suitable materials for the set of plates 510 can comprise stainless steel for the room temperature first plate 512, aluminum for the second plate 514 and copper for the remaining plates of the set of plates 510. Suitable materials for the external shield 502 can comprise stainless steel, for the first internal shield 504 can comprise aluminium, and for the remaining internal shields of the set of external and internal shields 500 can comprise copper.

At least one heat exchanger 540 can by physically coupled to each plate of the set of plates 510 that is intended to be cooled by the respective primary and/or auxiliary feed line. In one example, a heat exchanger can comprise a plurality of interconnected pathways (e.g., maze, spiral and/or serpentine) for allowing increased heat transfer from the respective plate to the respective cooled liquifiable gas that is running through the respective heat exchanger 540. Suitable materials for the heat exchangers 540 can comprise copper, silver, gold and/or platinum.

As illustrated, the set of plates 510 can comprise a room temperature first plate 512 (e.g., external plate), a second plate 514, third plate 518, fourth plate 517, fifth plate (e.g., still plate) 518, sixth plate 520 (e.g., cold plate) and seventh plate 522 (e.g., mixing chamber plate). Each of the sixth plate 520 (e.g., cold plate) and the seventh plate 522 (e.g., mixing chamber plate) can have physically coupled thereto quantum components such as components comprising and/or comprised by physical qubits of a quantum system.

A first internal section can be defined by the room temperature first plate 512 and the external shield 502. Internal thereto, a second internal section can be defined by the second plate 514 and the first internal shield 504. Internal thereto, a third internal section can be defined by the third plate 518 and the second internal shield 506. Internal thereto, a fourth internal section can be defined by the fourth plate 517 and a third internal shield 507. Internal thereto a fifth internal section can be defined by the third plate 518 (e.g., still plate) and a fourth internal shield 508, which fifth internal section can at least partially house a dilution refrigerator 524.

As shown, each of the second plate 514, third plate 518, fourth plate 517, third plate 518 (e.g., still plate), sixth plate 520 (e.g., cold plate) and seventh plate 522 (e.g., mixing chamber plate) can be cooled by the first bulk cooling system 408 in view of the first primary feed line 412*c* being fluidly coupled to a respective heat exchanger 540 that is physically coupled to a respective one of each of these plates and/or in view of the second primary feed line 412*e* being fluidly coupled to a respective heat exchanger 540 that is physically coupled to a respective one of each of the third plate 518 and the fourth plate 517. Also as shown, the second plate 514 can be cooled by the second bulk cooling system 410 in view of the auxiliary feed line 414*c* being fluidly coupled to a respective heat exchanger 540 that is physically coupled to the second plate 514.

One or more, such as all, of the third plate 518 (e.g., still plate), sixth plate 520 (e.g., cold plate) and/or seventh plate 522 (e.g., mixing chamber plate) can be further cooled by the dilution refrigerator 524 (e.g., dil. fridge) as known to one having ordinary skill in the art.

The valves, pumps and bulk cooling systems discussed above can be configured to allow for each more-internally-located plate to reach a cooler temperature than each less-internally-located plate. For example, the aforedescribed configuration can comprise the first bulk cooling system 408 being a liquid helium bulk cooling system and the second bulk cooling system 410 being a liquid nitrogen bulk cooling system. In one or more other embodiments, the first or second bulk cooling system instead can supply liquid xenon, liquid oxygen and/or liquid neon.

In use, the aforedescribed configuration can allow for cooling of the second plate 514 to about 75K to about 80K, cooling of the third plate 518 to about 4.2K to about 10K, cooling of the fourth plate 517 to about 1K, cooling of the third plate 518 (e.g., still plate) to about 0.5K to about 1K, cooling of the sixth plate 520 (e.g., cold plate) to about 0.1K, and cooling of the mixing chamber plate to about 0.005K to about 0.008K (e.g., in the mK range).

For example, in use, the liquid nitrogen second bulk cooling system 410 can be employed to first lower the second plate 514 and all plates below the second plate 514 (e.g., third plate 518, fourth plate 517, third plate 518 (e.g., still plate), sixth plate 520 (e.g., cold plate) and seventh plate 522 (e.g., mixing chamber plate) to about 75K to about 80K from room temperature, after the cryostat is vacuum sealed. In one or more embodiments, the temperature can be about 77K.

Next, the liquid helium bulk cooling system 408, via the second primary feed line 412*e* and second primary return line 412*f*, can be employed to drop the third plate 518 and the fourth plate 517 to their aforementioned respective temperatures, with the third plate 518 (e.g., still plate), sixth plate 520 (e.g., cold plate) and seventh plate 522 (e.g., mixing chamber plate) below the fourth plate 517 also being dropped to about 1K. It will be appreciated that one or more sensors internal to the cryostat 406 can be employed to make such determination as to whether the 75K to 80K temperature has been reached, which one or more sensors can be operably coupled to at least a respective processor, and which can be employed for determining when to start any next cooling cycle as described herein. The valves 416*a* can remain open and liquifiable gas can continue to run through these valves 416*a* via the bulk cooling system 410 during the operation of the bulk cooling system 408 pumping liquifiable cooling gas through the valves 416*b*.

This temperature drop can be achieved by operating the vacuum pump 532 to pump on the second primary return line 412*f* to more rapidly lower the temperature of the fourth plate 517. Indeed, the vacuum pump 532 can allow for lowering of the temperature of the fourth plate 517 to about 1K which is lower than can be achieved by use of liquid helium alone (e.g., without use of the vacuum pump 532). It is noted that the vacuum pump 532 can be physically decoupled from the cryostat 406 by a section of the cooling return line (e.g., second primary return line 412*f* disposed between the cryostat 406 and the vacuum pump 532.

Next, the liquid helium bulk cooling system 408, via the first primary feed line 412*c* and first primary return line 412*d*, can be employed to drop the second plate 514, the third plate 518 and the fourth plate 517 to their aforementioned respective temperatures, with the third plate 518 (e.g., still plate), sixth plate 520 (e.g., cold plate) and seventh plate 522 (e.g., mixing chamber plate) below the fourth plate 517 also being dropped to about 1K. While pumping a liquifiable cooling gas through the first primary feed line 412*c* and first primary return line 412*d*, the valves 416*b* can be closed or the valves 416*b* can remain open to allow for pumping of liquifiable cooling gas therethrough by the same bulk cooling system 408. Also, while pumping a liquifiable cooling gas through the first primary feed line 412*c* and first primary return line 412*d*, the valves 416*a* can remain open to allow for pumping of liquifiable cooling gas therethrough by the bulk cooling system 410.

The dilution refrigerator 524 can be engaged at least after the aforementioned 1K temperature has been reached.

By operation of the dilution refrigerator 524, the third plate 518 (e.g., still plate), sixth plate 520 (e.g., cold plate) and seventh plate 522 (e.g., mixing chamber plate) can be allowed to reach their respective cooling temperatures. For the seventh plate 522 (e.g., mixing chamber plate), this can be about 0.005K to about 0.05K, such as about 0.008K. During operation of the dilution refrigerator 524, the valves 530*a* and 530*b* can be closed, and bypass valve 530*c* can allow for continued circulation of a liquifiable gas from the bulk cooling system 408 through the valves 416*c*. Also, during this dilution refrigerator cooling cycle, a liquifiable cooling gas can continue to be pumped through the valves 416*a* by the bulk cooling system 410.

It is noted that one or more additional valves, primary feed lines and/or primary return lines can be employed in one or more other embodiments.

As a result of the aforementioned process and non-limiting system 400, the cryostat 406 can be efficiently cooled (e.g., the seventh plate 522 (e.g., mixing chamber plate) can reach a temperature in the mK range) in a much more rapid time than with existing cryostat frameworks. This can be at least partially due to use of the vacuum pump 532. To open the cryostat 406, any of the aforementioned supply, return and/or feed lines can be suitable fluidly coupled to a warm gas supply system for more rapidly heating up an internal temperature of the cryostat 406 than with existing cryostat frameworks. That is, an advantage of the above-mentioned systems and/or method can be more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

Figure 6:
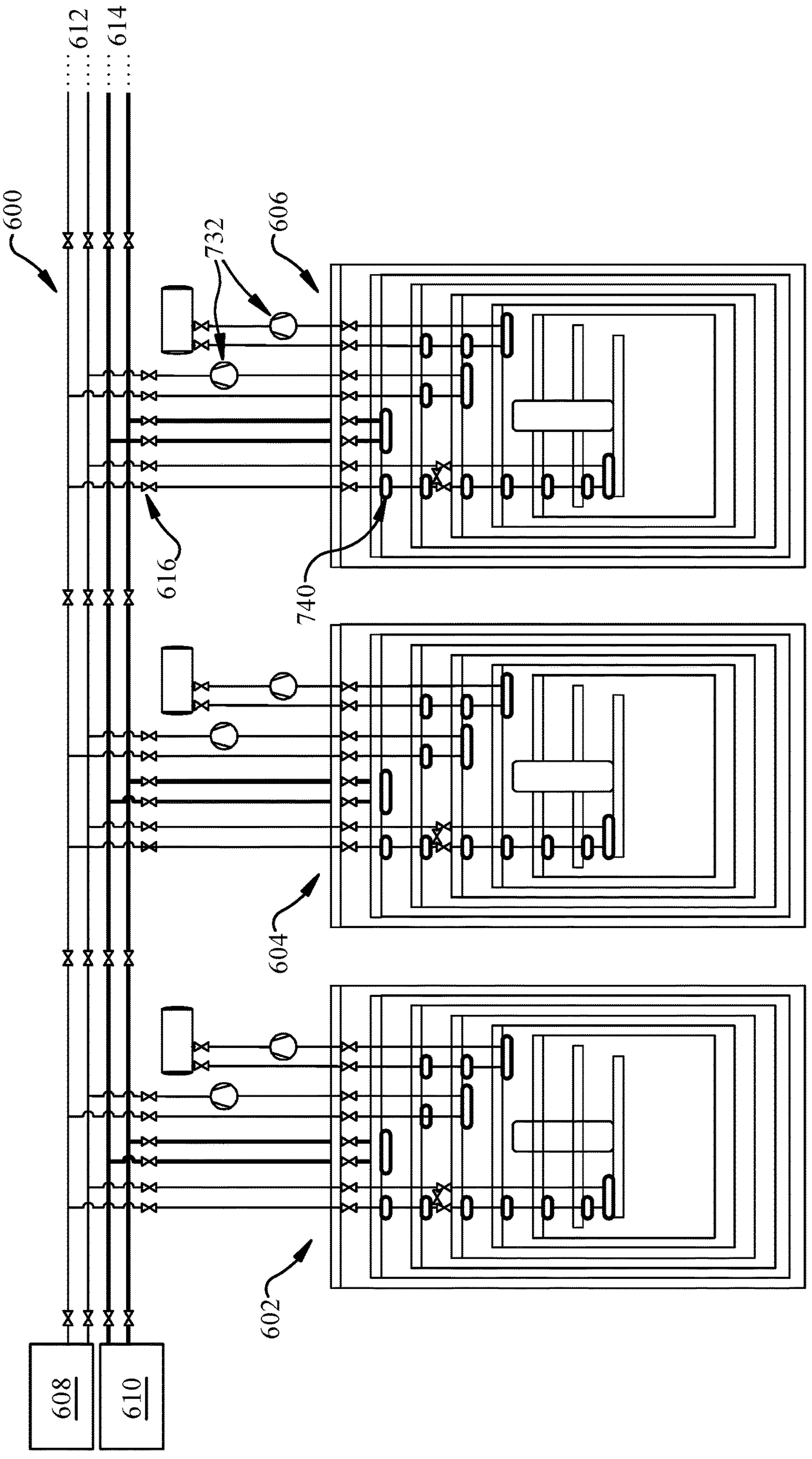
FIG. 6 illustrates a cryostat system, in accordance with one or more embodiments described herein.
Figure 7:
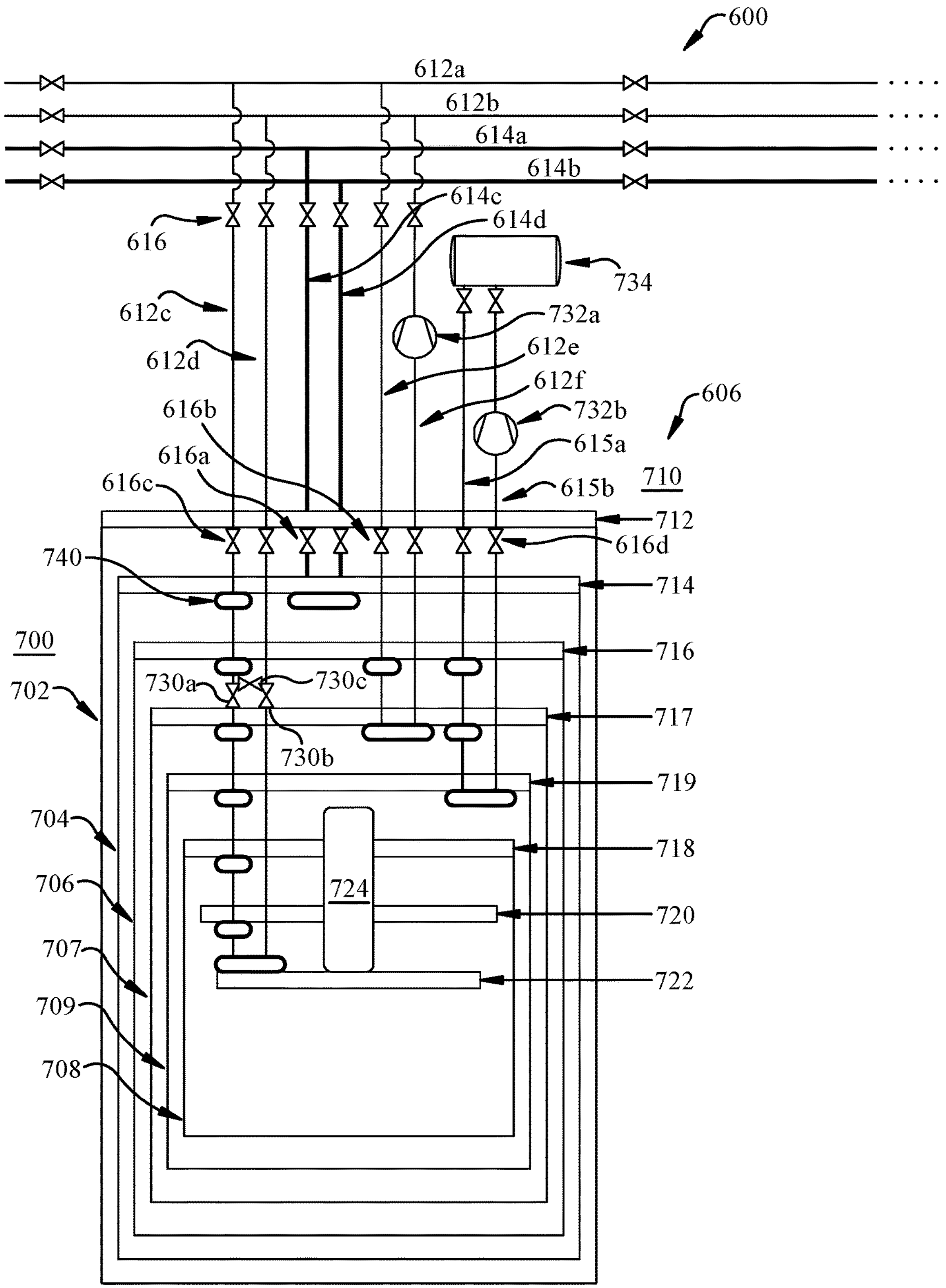
FIG. 7 illustrates another view of the cryostat system of FIG. 6, in accordance with one or more embodiments described herein.

Turning next to FIGS. 6 and 7, the non-limiting system 600 can comprise one or more bulk cooling systems 608 and/or 610 (also herein referred to as liquifiable gas farms) that can employ and provide a liquifiable gas to cool a cryostat. The bulk cooling systems 608 and 610 can provide different and/or same liquifiable gases. Each bulk cooling system 608 and 610 can be fluidly coupled to one or more cryostats, such as to all cryostats, of the non-limiting system 600.

The non-limiting system 600 also can comprise one or more such cryostats 602, 604 and/or 606. These cryostats can be similar to and/or different from one another, such as having different numbers of plates, internal thermally insulated sections and/or internal components. Certainly, each cryostat can have different internal components at the most internal stages of such cryostats.

A first set of supply and return lines 612 can supply a first liquifiable gas from the first bulk cooling system 608 to one or more of the cryostats 602, 604 and/or 606. The supply line can provide a cooled liquifiable gas from the first bulk cooling system 608 to the one or more cryostats and the return line can take warmed gas from the one or more cryostats back to the first bulk cooling system 608 for re-cooling. A primary set of feed and return lines can extend from and fluidly couple the first set of supply and return lines 612 and the one or more cryostats.

A second set of supply and return lines 614 can supply a second liquifiable gas from the second bulk cooling system 610 to one or more of the cryostats 602, 604 and/or 606. The supply line can provide a cooled liquifiable gas from the second bulk cooling system 610 to the one or more cryostats and the return line can take warmed gas from the one or more cryostats back to the second bulk cooling system 610 for re-cooling. An auxiliary set of feed and return lines can extend from and fluidly couple the second set of supply and return lines 614 and the one or more cryostats.

Each of the first set of supply and return lines 612, the second set of supply and return lines 614, the primary feed and return lines and the auxiliary feed and return lines can comprise one or more valves 616. One or more of such valves 616 can be internal to a cryostat of the one or more cryostats.

As illustrated, each of the cryostats 602, 604 and/or 606 can comprise a plurality of plates that together with a plurality of external and internal shields can define a plurality of internal thermally insulated sections. Where a first internal thermally insulated section is internal to a second internal thermally insulated section, the second internal thermally insulated section can be at least partially thermally insulated to, and retain a cooler temperature than, the first internal thermally insulated section.

Turning now to FIG. 7, the cryostat 606 is illustrated separately from the other cryostats 602 and 604 to provide greater illustration of one cryostat of the non-limiting system 600. As illustrated, the first bulk cooling system 608 can be fluidly coupled to the cryostat 606 by a first primary set of a first primary feed line 612*c* and a first primary return line 612*d* and by a second primary set of a second primary feed line 612*e* and a second primary return line 612*f*. The second bulk cooling system 610 can be fluidly coupled to the cryostat 606 by an auxiliary set of an auxiliary feed line 614*c* and an auxiliary return line 614*d*. Further, a vacuum pump 732*a* can be fluidly coupled to the second primary return line 612*f*.

In addition, another bulk cooling system or a storage tank 734, such as a liquid helium-3 (3He) storage tank 734, can be fluidly coupled to a tertiary set of a tertiary feed line 615*a* and a tertiary return line 615*b*, with the tertiary return line 615*b* having a vacuum pump 732*b* fluidly coupled thereto.

One or more valves 616 allow for transmission of liquifiable gas at the various supply, return and feed lines at times that can be different from and/or at least partially parallel to one another.

A set of plates 710 and a set of external and internal shields 700 define a plurality of internal thermally insulated sections (e.g., heat-shielded sections) of the cryostat 606. Suitable materials for the set of plates 710 can comprise stainless steel for the room temperature first plate 712, aluminum for the second plate 714 and copper for the remaining plates of the set of plates 710. Suitable materials for the external shield 702 can comprise stainless steel, for the first internal shield 704 can comprise aluminium, and for the remaining internal shields of the set of external and internal shields 700 can comprise copper.

At least one heat exchanger 740 can by physically coupled to each plate of the set of plates 710 that is intended to be cooled by the respective primary and/or auxiliary feed line. In one example, a heat exchanger can comprise a plurality of interconnected pathways (e.g., maze, spiral and/or serpentine) for allowing increased heat transfer from the respective plate to the respective cooled liquifiable gas that is running through the respective heat exchanger 740. Suitable materials for the heat exchangers 740 can comprise copper, silver, gold and/or platinum.

As illustrated, the set of plates 710 can comprise a room temperature first plate 712 (e.g., external plate), a second plate 714, third plate 718, fourth plate 717, fifth plate 719, sixth plate (e.g., still plate) 718, seventh plate 720 (e.g., cold plate) and eighth plate 722 (e.g., mixing chamber plate). Each of the seventh plate 720 (e.g., cold plate) and the eighth plate 722 (e.g., mixing chamber plate) can have physically coupled thereto quantum components such as components comprising and/or comprised by physical qubits of a quantum system.

A first internal section can be defined by the room temperature first plate 712 and the external shield 702. Internal thereto, a second internal section can be defined by the second plate 714 and the first internal shield 704. Internal thereto, a third internal section can be defined by the third plate 718 and the second internal shield 706. Internal thereto, a fourth internal section can be defined by the fourth plate 717 and a third internal shield 707. Internal thereto a fifth internal section can be defined by the fifth plate 719 and a fourth internal shield 709. Internal thereto a sixth internal section can be defined by the third plate 718 (e.g., still plate) and a fifth internal shield 708, which sixth internal section can at least partially house a dilution refrigerator 724.

As shown, each of the second plate 714, third plate 718, fourth plate 717, fifth plate 719, third plate 718 (e.g., still plate), seventh plate 720 (e.g., cold plate) and eighth plate 722 (e.g., mixing chamber plate) can be cooled by the first bulk cooling system 608 in view of the first primary feed line 612*c* being fluidly coupled to a respective heat exchanger 740 that is physically coupled to a respective one of each these plates and/or in view of the second primary feed line 612*e* being fluidly coupled to a respective heat exchanger 740 that is physically coupled to the third plate 718 and the fourth plate 717. Also as shown, the second plate 714 can be cooled by the second bulk cooling system 610 in view of the auxiliary feed line 614*c* being fluidly coupled to a respective heat exchanger 740 that is physically coupled to the second plate 714. Also as shown, the third plate 718, fourth plate 717 and fifth plate 719 can be cooled by the helium-3 storage tank 734 in view of the tertiary feed line 615*a* being fluidly coupled to a respective heat exchanger 740 that is physically coupled to each of the third plate 718, fourth plate 717 and fifth plate 719.

One or more, such as all, of the third plate 718 (e.g., still plate), seventh plate 720 (e.g., cold plate) and/or eighth plate 722 (e.g., mixing chamber plate) can be further cooled by the dilution refrigerator 724 (e.g., dil. fridge) as known to one having ordinary skill in the art.

The valves, pumps and bulk cooling systems discussed above can be configured to allow for each more-internally-located plate to reach a cooler temperature than each less-internally-located plate. For example, the aforedescribed configuration can comprise the first bulk cooling system 608 being a liquid helium bulk cooling system and the second bulk cooling system 610 being a liquid nitrogen bulk cooling system. In one or more other embodiments, the first or second bulk cooling system instead can supply liquid xenon, liquid oxygen and/or liquid neon.

In use, the aforedescribed configuration can allow for cooling of the second plate 714 to about 75K to about 80K, cooling of the third plate 718 to about 4.2K to about 10K, cooling of the fourth plate 717 to about 1K, cooling of the fifth plate 719 to about 0.3K, cooling of the third plate 718 (e.g., still plate) to about 0.5K to about 1K, cooling of the seventh plate 720 (e.g., cold plate) to about 0.1K, and cooling of the mixing chamber plate to about 0.005K to about 0.008K (e.g., in the mK range).

For example, in use, the liquid nitrogen second bulk cooling system 610 can be employed to first lower the second plate 714 and all plates below the second plate 714 (e.g., third plate 718, fourth plate 717, fifth plate 719, third plate 718 (e.g., still plate), seventh plate 720 (e.g., cold plate) and eighth plate 722 (e.g., mixing chamber plate) to about 75K to about 80K from room temperature, after the cryostat is vacuum sealed. In one or more embodiments, the temperature can be about 77K.

Next, the liquid helium bulk cooling system 608, via the second primary feed line 612*e* and second primary return line 612*f*, can be employed to drop the third plate 718 and the fourth plate 717 to their aforementioned respective temperatures, with the fifth plate 719, third plate 718 (e.g., still plate), seventh plate 720 (e.g., cold plate) and eighth plate 722 (e.g., mixing chamber plate) below the fourth plate 717 also being dropped to about 1K. It will be appreciated that one or more sensors internal to the cryostat 606 can be employed to make such determination as to whether the 75K to 80K temperature has been reached, which one or more sensors can be operably coupled to a respective processor, and which can be employed for determining when to start any next cooling cycle as described herein. The valves 616*a* can remain open and liquifiable gas can continue to run through these valves 616*a* via the bulk cooling system 610 during the operation of the bulk cooling system 608 pumping liquifiable cooling gas through the valves 616*b*.

This temperature drop can be achieved by operating the vacuum pump 732*a* to pump on the second primary return line 612*f* to more rapidly lower the temperature of the fourth plate 717. Indeed, the vacuum pump 732*a* can allow for lowering of the temperature of the fourth plate 717 to about 1K which is lower than can be achieved by use of liquid helium alone (e.g., without use of the vacuum pump 732*a*). It is noted that the vacuum pump 732*a* can be physically decoupled from the cryostat 606 by a section of the cooling return line (e.g., second primary return line 612*f* disposed between the cryostat 606 and the vacuum pump 732*a*.

Next, the helium-3 storage tank 734 can be employed, via the tertiary set of the tertiary feed line 615*a* and tertiary return line 615b, to drop the third plate 718, fourth plate 717 and fifth plate 719 to their aforementioned respective temperatures, with the third plate 718 (e.g., still plate), seventh plate 720 (e.g., cold plate) and eighth plate 722 (e.g., mixing chamber plate) below the fifth plate 719 also being dropped to about 0.3K. During this cooling cycle, a liquifiable cooling gas can continue to be pumped through the valves 616a by the bulk cooling system 610 and through the valves 616b by the bulk cooling system 608.

This temperature drop can be achieved by operating the vacuum pump 732b to pump on the tertiary return line 615b to more rapidly lower the temperature of the fifth plate 719. Indeed, the vacuum pump 732b can allow for lowering of the temperature of the fifth plate 719 to about 0.3K which is lower than can be achieved by use of liquid helium or even helium-3 alone (e.g., without use of the vacuum pump 732b). It is noted that the vacuum pump 732b can be physically decoupled from the cryostat 606 by a section of the cooling return line (e.g., tertiary return line 615b disposed between the cryostat 606 and the vacuum pump 732b.

Next, the liquid helium bulk cooling system 608, via the first primary feed line 612c first primary return line 612d, can be employed to drop the second plate 714, the third plate 718, the fourth plate 717 and the fifth plate 719 to their aforementioned respective temperatures, with the third plate 718 (e.g., still plate), seventh plate 720 (e.g., cold plate) and eighth plate 722 (e.g., mixing chamber plate) below the fifth plate 719 also being dropped to about 1K. During this cooling cycle, a liquifiable cooling gas can continue to be pumped through the valves 616a by the bulk cooling system 610, through the valves 616b by the bulk cooling system 608, and/or through the valves 616d from the storage tank 734.

The dilution refrigerator 724 can be engaged at upon the aforementioned 1K temperature being reached.

By operation of the dilution refrigerator 724, the third plate 718 (e.g., still plate), seventh plate 720 (e.g., cold plate) and eighth plate 722 (e.g., mixing chamber plate) can be allowed to reach their respective cooling temperatures. For the eighth plate 722 (e.g., mixing chamber plate), this can be about 0.005K to about 0.05K, such as about 0.008K. During operation of the dilution refrigerator 724, the valves 730a and 730b can be closed, and bypass valve 730c can allow for continued circulation of a liquifiable gas from the bulk cooling system 608 through the valves 616b. Also, during this cooling cycle, a liquifiable cooling gas can continue to be pumped through the valves 616a by the bulk cooling system 610, through the valves 616b by the bulk cooling system 608, and/or through the valves 616d from the storage tank 734.

It is noted that one or more additional valves, primary feed lines and/or primary return lines can be employed in one or more other embodiments.

As a result of the aforementioned process and non-limiting system 600, the cryostat 606 can be efficiently cooled (e.g., the eighth plate 722 (e.g., mixing chamber plate) can reach a temperature in the mK range) in a much more rapid time than with existing cryostat frameworks. This can be at least partially due to use of the vacuum pumps 732a and 732b and the additional helium-3 storage tank 734 (e.g., additional relative to the non-limiting system 400). To open the cryostat 606, any of the aforementioned supply, return and/or feed lines can be suitable fluidly coupled to a warm gas supply system for more rapidly heating up an internal temperature of the cryostat 606 than with existing cryostat frameworks. That is, an advantage of the above-mentioned systems and/or method can be more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

Figure 8:
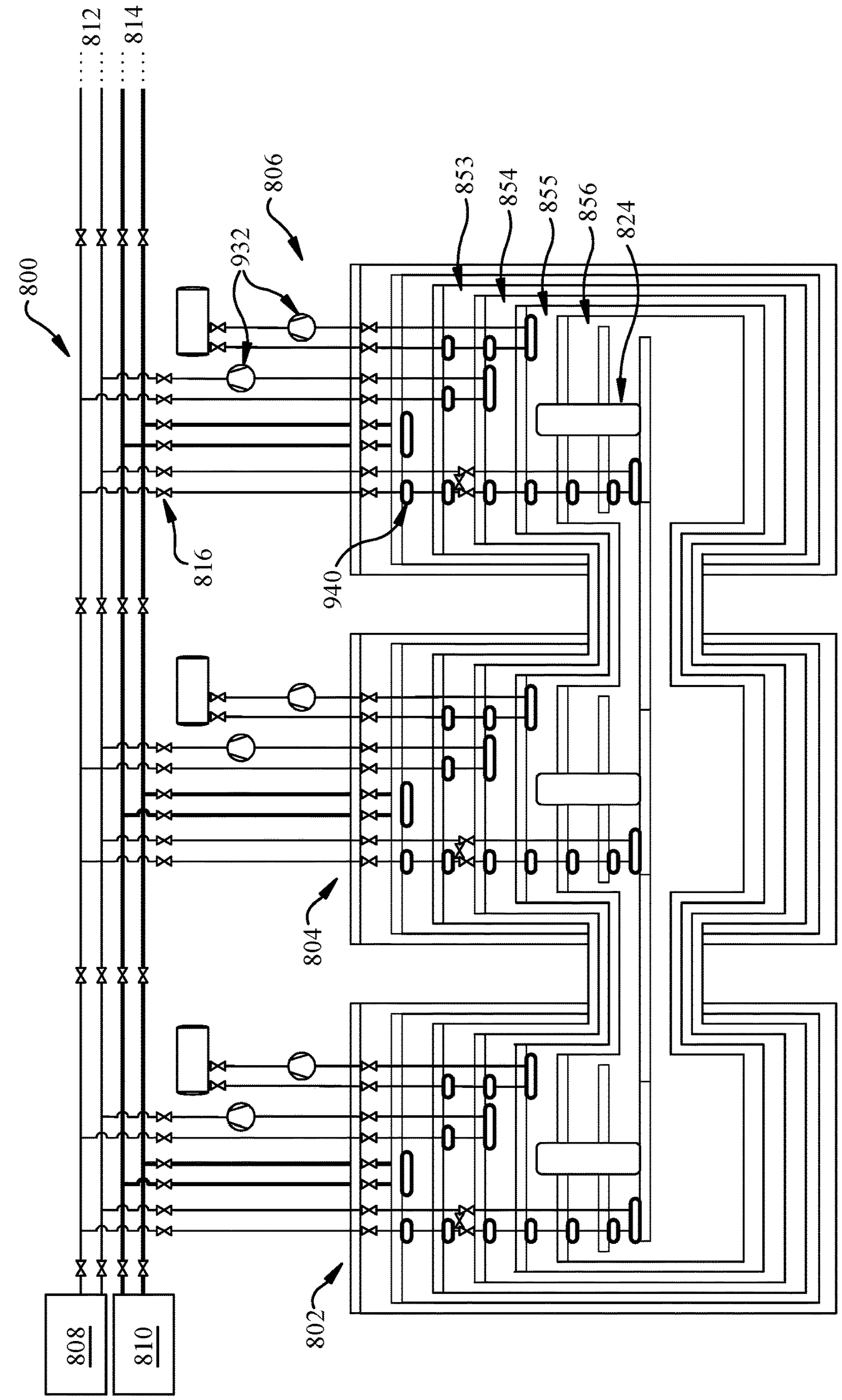
FIG. 8 illustrates a cryostat system, in accordance with one or more embodiments described herein.
Figure 9:
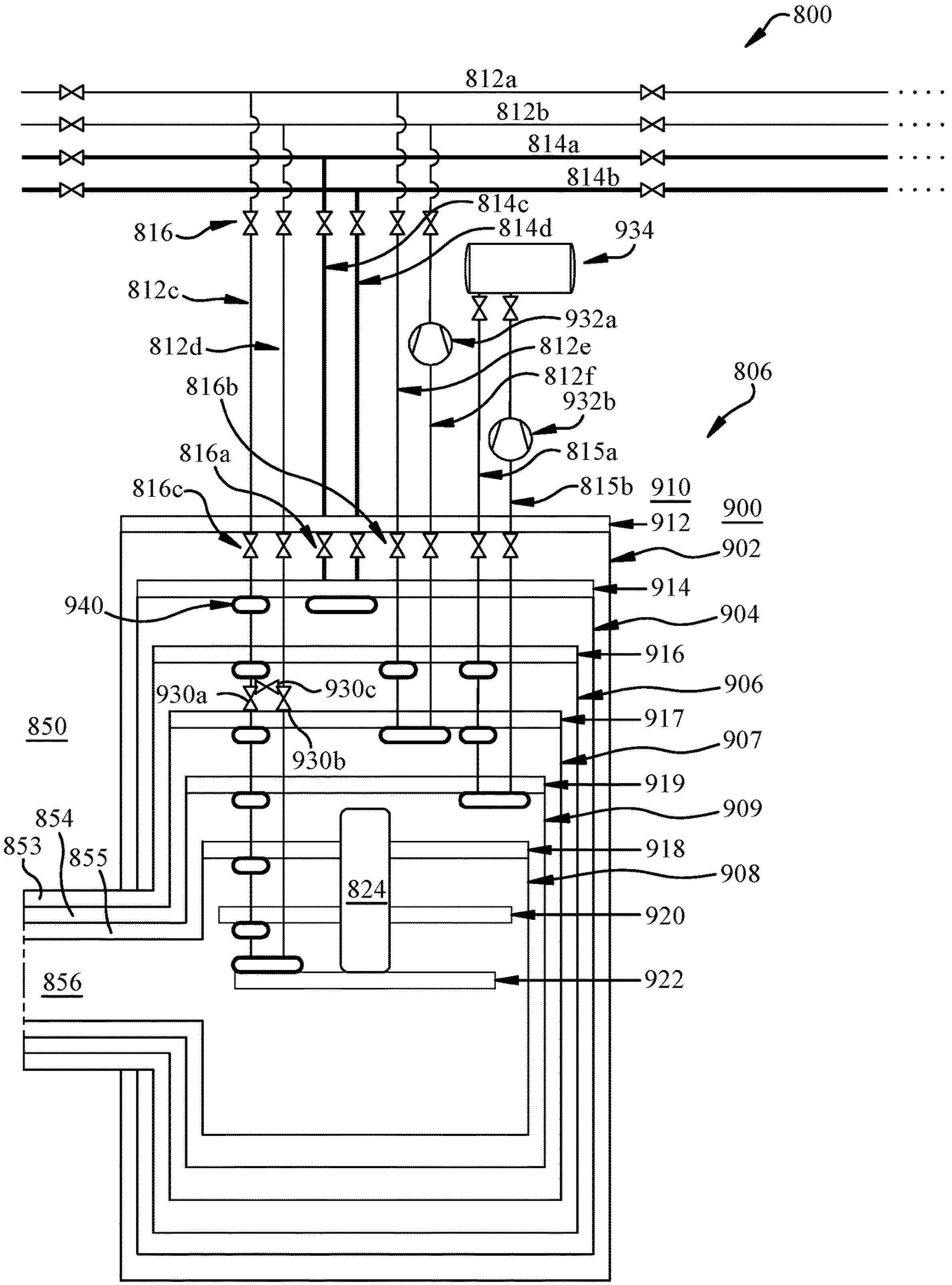
FIG. 9 illustrates another view of the cryostat system of FIG. 8, in accordance with one or more embodiments described herein.

Turning now to FIGS. 8 and 9, the non-limiting system 800 can comprise one or more bulk cooling systems 808 and/or 810 (also herein referred to as liquifiable gas farms) that can employ and provide a liquifiable gas to cool a cryostat. The bulk cooling systems 808 and 810 can provide different and/or same liquifiable gases. Each bulk cooling system 808 and 810 can be fluidly coupled to one or more cryostats, such as to all cryostats, of the non-limiting system 800.

The non-limiting system 800 also can comprise one or more such cryostats 802, 804 and/or 806. These cryostats can be similar to and/or different from one another, such as having different numbers of plates, internal thermally insulated sections and/or internal components. Certainly, each cryostat can have different internal components at the most internal stages of such cryostats.

A first set of supply and return lines 812 can supply a first liquifiable gas from the first bulk cooling system 808 to one or more of the cryostats 802, 804 and/or 806. The supply line can provide a cooled liquifiable gas from the first bulk cooling system 808 to the one or more cryostats and the return line can take warmed gas from the one or more cryostats back to the first bulk cooling system 808 for re-cooling. A primary set of feed and return lines can extend from and fluidly couple the first set of supply and return lines 812 and the one or more cryostats.

A second set of supply and return lines 814 can supply a second liquifiable gas from the second bulk cooling system 810 to one or more of the cryostats 802, 804 and/or 806. The supply line can provide a cooled liquifiable gas from the second bulk cooling system 810 to the one or more cryostats and the return line can take warmed gas from the one or more cryostats back to the second bulk cooling system 810 for re-cooling. An auxiliary set of feed and return lines can extend from and fluidly couple the second set of supply and return lines 814 and the one or more cryostats.

Each of the first set of supply and return lines 812, the second set of supply and return lines 814, the primary feed and return lines and the auxiliary feed and return lines can comprise one or more valves 816. One or more of such valves 816 can be internal to a cryostat of the one or more cryostats.

As illustrated, each of the cryostats 802, 804 and/or 806 can comprise a plurality of plates that together with a plurality of external and internal shields can define a plurality of internal thermally insulated sections. Where a first internal thermally insulated section is internal to a second internal thermally insulated section, the second internal thermally insulated section can be at least partially thermally insulated to, and retain a cooler temperature than, the first internal thermally insulated section.

Turning now to FIG. 9, the cryostat 806 is illustrated separately from the other cryostats 802 and 804 to provide greater illustration of one cryostat of the non-limiting system 800. As illustrated, the first bulk cooling system 808 can be fluidly coupled to the cryostat 806 by a first primary set of a first primary feed line 812c and a first primary return line 812d and by a second primary set of a second primary feed line 812e and a second primary return line 812f. The second bulk cooling system 810 can be fluidly coupled to the cryostat 806 by an auxiliary set of an auxiliary feed line 814*c* and an auxiliary return line 814*d*. Further, a vacuum pump 932*a* can be fluidly coupled to the second primary return line 812*f*.

In addition, another bulk cooling system or a storage tank 934, such as a liquid helium-3 (3He) storage tank 934, can be fluidly coupled to a tertiary set of a tertiary feed line 815*a* and a tertiary return line 815*b*, with the tertiary return line 815*b* having a vacuum pump 932*b* fluidly coupled thereto.

One or more valves 816 allow for transmission of liquifiable gas at the various supply, return and feed lines at times that can be different from and/or at least partially parallel to one another.

A set of plates 910 and a set of external and internal shields 900 define a plurality of internal thermally insulated sections (e.g., heat-shielded sections) of the cryostat 806. Suitable materials for the set of plates 910 can comprise stainless steel for the room temperature first plate 912, aluminum for the second plate 914 and copper for the remaining plates of the set of plates 910. Suitable materials for the external shield 902 can comprise stainless steel, for the first internal shield 904 can comprise aluminium, and for the remaining internal shields of the set of external and internal shields 900 can comprise copper.

At least one heat exchanger 940 can by physically coupled to each plate of the set of plates 910 that is intended to be cooled by the respective primary and/or auxiliary feed line. In one example, a heat exchanger can comprise a plurality of interconnected pathways (e.g., maze, spiral and/or serpentine) for allowing increased heat transfer from the respective plate to the respective cooled liquifiable gas that is running through the respective heat exchanger 940. Suitable materials for the heat exchangers 940 can comprise copper, silver, gold and/or platinum.

As illustrated, the set of plates 910 can comprise a room temperature first plate 912 (e.g., external plate), a second plate 914, third plate 918, fourth plate 917, fifth plate 919, sixth plate (e.g., still plate) 918, seventh plate 920 (e.g., cold plate) and eighth plate 922 (e.g., mixing chamber plate). Each of the seventh plate 920 (e.g., cold plate) and the eighth plate 922 (e.g., mixing chamber plate) can have physically coupled thereto quantum components such as components comprising and/or comprised by physical qubits of a quantum system.

A first internal section can be defined by the room temperature first plate 912 and the external shield 902. Internal thereto, a second internal section can be defined by the second plate 914 and the first internal shield 904. Internal thereto, a third internal section can be defined by the third plate 918 and the second internal shield 906. Internal thereto, a fourth internal section can be defined by the fourth plate 917 and a third internal shield 907. Internal thereto a fifth internal section can be defined by the fifth plate 919 and a fourth internal shield 909. Internal thereto a sixth internal section can be defined by the third plate 918 (e.g., still plate) and a fifth internal shield 908, which sixth internal section can at least partially house a dilution refrigerator 824.

As illustrated, at FIGS. 8 and 9, the third internal section (e.g., defined by the third plate 918 and the second internal shield 906) of a first cryostat (e.g., cryostat 806) can be open to the third internal section of one or more additional cryostats of the non-limiting system 800, such as to the cryostats 802 and 804, such as by connecting sections 853. The fourth internal section (e.g., defined by the fourth plate 917 and the third internal shield 907) of the first cryostat 806 can be open to the fourth internal section of one or more additional cryostats of the non-limiting system 800, such as to the cryostats 802 and 804, such as by connecting sections 854. The fifth internal section (e.g., defined by the fifth plate 919 and the fourth internal shield 909) of the first cryostat 806 can be open to the fifth internal section of one or more additional cryostats of the non-limiting system 800, such as to the cryostats 802 and 804, such as by connecting sections 855. The sixth internal section (e.g., defined by the third plate 918 (e.g., still plate) and the fifth internal shield 908) of the first cryostat 806 can be open to the sixth internal section of one or more additional cryostats of the non-limiting system 800, such as to the cryostats 802 and 804, such as by connecting sections 856.

In one or more other embodiments, less than all third internal sections of the cryostats of a non-limiting system can be open to one another, less than all fourth internal sections of the cryostats of a non-limiting system can be open to one another, less than all fifth internal sections of the cryostats of a non-limiting system can be open to one another, and/or less than all sixth internal sections of the cryostats of a non-limiting system can be open to one another.

In one or more other embodiments, a non-limiting system can omit connection of any one of third internal sections, fourth internal sections, fifth internal sections and/or sixth internal sections.

In one or more embodiments, as illustrated at FIG. 8, mixing chamber plates (e.g., eighth plate 922) of two or more cryostats can be coupled to one another. Additional mixing chamber plate length can thus be provided in the connecting sections 858 between cryostats, thus allowing for much more space/real estate for cryogenically operating components. As illustrated at FIG. 9, such interconnected mixing plates can be omitted in one or more other embodiments and/or merely omitted between less than all cryostats of a non-limiting system.

Turning back to FIG. 9, each of the second plate 914, third plate 918, fourth plate 917, fifth plate 919, third plate 918 (e.g., still plate), seventh plate 920 (e.g., cold plate) and eighth plate 922 (e.g., mixing chamber plate) can be cooled by the first bulk cooling system 808 in view of the first primary feed line 812*c* being fluidly coupled to a respective heat exchanger 940 that is physically coupled to a respective one of each these plates and/or in view of the second primary feed line 812*e* being fluidly coupled to a respective heat exchanger 940 that is physically coupled to the third plate 918 and the fourth plate 917. Also as shown, the second plate 914 can be cooled by the second bulk cooling system 810 in view of the auxiliary feed line 814*c* being fluidly coupled to a respective heat exchanger 940 that is physically coupled to the second plate 914. Also as shown, the third plate 918, fourth plate 917 and fifth plate 919 can be cooled by the helium-3 storage tank 934 in view of the tertiary feed line 815*a* being fluidly coupled to a respective heat exchanger 940 that is physically coupled to each of the third plate 918, fourth plate 917 and fifth plate 919.

One or more, such as all, of the third plate 918 (e.g., still plate), seventh plate 920 (e.g., cold plate) and/or eighth plate 922 (e.g., mixing chamber plate) can be further cooled by the dilution refrigerator 824 (e.g., dil. fridge) as known to one having ordinary skill in the art.

The valves, pumps and bulk cooling systems discussed above can be configured to allow for each more-internally-located plate to reach a cooler temperature than each less-internally-located plate. For example, the aforedescribed configuration can comprise the first bulk cooling system 808 being a liquid helium bulk cooling system and the second bulk cooling system 810 being a liquid nitrogen bulk cooling system. In one or more other embodiments, the first or second bulk cooling system instead can supply liquid xenon, liquid oxygen and/or liquid neon.

In use, the aforedescribed configuration can allow for cooling of the second plate 914 to about 75K to about 80K, cooling of the third plate 918 to about 4.2K to about 10K, cooling of the fourth plate 917 to about 1K, cooling of the fifth plate 919 to about 0.3K, cooling of the third plate 918 (e.g., still plate) to about 0.5K to about 1K, cooling of the seventh plate 920 (e.g., cold plate) to about 0.11K, and cooling of the mixing chamber plate to about 0.005K to about 0.008K (e.g., in the mK range).

For example, in use, the liquid nitrogen second bulk cooling system 810 can be employed to first lower the second plate 914 and all plates below the second plate 914 (e.g., third plate 918, fourth plate 917, fifth plate 919, third plate 918 (e.g., still plate), seventh plate 920 (e.g., cold plate) and eighth plate 922 (e.g., mixing chamber plate) to about 75K to about 80K from room temperature, after the cryostat is vacuum sealed. In one or more embodiments, the temperature can be about 77K.

Next, the liquid helium bulk cooling system 808, via the second primary feed line 812*e* and the second primary return line 812*f*, can be employed to drop the third plate 918 and the fourth plate 917 to their aforementioned respective temperatures, with the fifth plate 919, third plate 918 (e.g., still plate), seventh plate 920 (e.g., cold plate) and eighth plate 922 (e.g., mixing chamber plate) below the fourth plate 917 also being dropped to about 1K. It will be appreciated that one or more sensors internal to the cryostat 806 can be employed to make such determination as to whether the 75K to 80K temperature has been reached, which one or more sensors can be operably coupled to a respective processor, and which can be employed for determining when to start any next cooling cycle as described herein. The valves 816*a* can remain open and liquifiable gas can continue to run through these valves 816*a* via the bulk cooling system 810 during the operation of the bulk cooling system 808 pumping liquifiable cooling gas through the valves 816*b*.

This temperature drop can be achieved by operating the vacuum pump 932*a* to pump on the second primary return line 812*f* to more rapidly lower the temperature of the fourth plate 917. Indeed, the vacuum pump 932*a* can allow for lowering of the temperature of the fourth plate 917 to about 1K which is lower than can be achieved by use of liquid helium alone (e.g., without use of the vacuum pump 932*a*). It is noted that the vacuum pump 932*a* can be physically decoupled from the cryostat 806 by a section of the cooling return line (e.g., second primary return line 812*f* disposed between the cryostat 806 and the vacuum pump 932*a*.

Next, the helium-3 storage tank 934 can be employed, via the tertiary set of tertiary feed line 815*a* and tertiary return line 815*b*, to drop the third plate 918, fourth plate 917 and fifth plate 919 to their aforementioned respective temperatures, with the third plate 918 (e.g., still plate), seventh plate 920 (e.g., cold plate) and eighth plate 922 (e.g., mixing chamber plate) below the fifth plate 919 also being dropped to about 0.3K. During this cooling cycle, a liquifiable cooling gas can continue to be pumped through the valves 816*a* by the bulk cooling system 810 and through the valves 816*b* by the bulk cooling system 808.

This temperature drop can be achieved by operating the vacuum pump 932*b* to pump on the tertiary return line 815*b* to more rapidly lower the temperature of the fifth plate 919. Indeed, the vacuum pump 932*b* can allow for lowering of the temperature of the fifth plate 919 to about 0.3K which is lower than can be achieved by use of liquid helium or even helium-3 alone (e.g., without use of the vacuum pump 932*b*). It is noted that the vacuum pump 932*b* can be physically decoupled from the cryostat 806 by a section of the cooling return line (e.g., tertiary return line 815*b* disposed between the cryostat 806 and the vacuum pump 932*b*.

Next, the liquid helium bulk cooling system 808, via the first primary feed line 812*c* and first primary return line 812*d*, can be employed to drop the second plate 914, the third plate 918, the fourth plate 917 and the fifth plate 919 to their aforementioned respective temperatures, with the third plate 918 (e.g., still plate), seventh plate 920 (e.g., cold plate) and eighth plate 922 (e.g., mixing chamber plate) below the fifth plate 919 also being dropped to about 1K. During this cooling cycle, a liquifiable cooling gas can continue to be pumped through the valves 816*a* by the bulk cooling system 810, through the valves 816*b* by the bulk cooling system 808, and/or through the valves 816*d* from the storage tank 934.

The dilution refrigerator 824 can be engaged at upon the aforementioned 1K temperature being reached.

By operation of the dilution refrigerator 824, the third plate 918 (e.g., still plate), seventh plate 920 (e.g., cold plate) and eighth plate 922 (e.g., mixing chamber plate) can be allowed to reach their respective cooling temperatures. For the eighth plate 922 (e.g., mixing chamber plate), this can be about 0.005K to about 0.05K, such as about 0.008K. During operation of the dilution refrigerator 824, the valves 930*a* and 930*b* can be closed, and bypass valve 930*c* can allow for continued circulation of a liquifiable gas from the bulk cooling system 808 through the valves 816*b*. Also, during this cooling cycle, a liquifiable cooling gas can continue to be pumped through the valves 816*a* by the bulk cooling system 810, through the valves 816*b* by the bulk cooling system 808, and/or through the valves 816*d* from the storage tank 934.

It is noted that one or more additional valves, primary feed lines and/or primary return lines can be employed in one or more other embodiments.

As a result of the aforementioned process and non-limiting system 800, the cryostat 806 can be efficiently cooled (e.g., the eighth plate 922 (e.g., mixing chamber plate) can reach a temperature in the mK range) in a much more rapid time than with existing cryostat frameworks. This can be at least partially due to use of the vacuum pumps 932*a* and 932*b* and the additional helium-3 storage tank 934 (e.g., additional relative to the non-limiting system 400). To open the cryostat 806, any of the aforementioned supply, return and/or feed lines can be suitable fluidly coupled to a warm gas supply system for more rapidly heating up an internal temperature of the cryostat 806 than with existing cryostat frameworks. That is, an advantage of the above-mentioned systems and/or method can be more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

Figure 10:
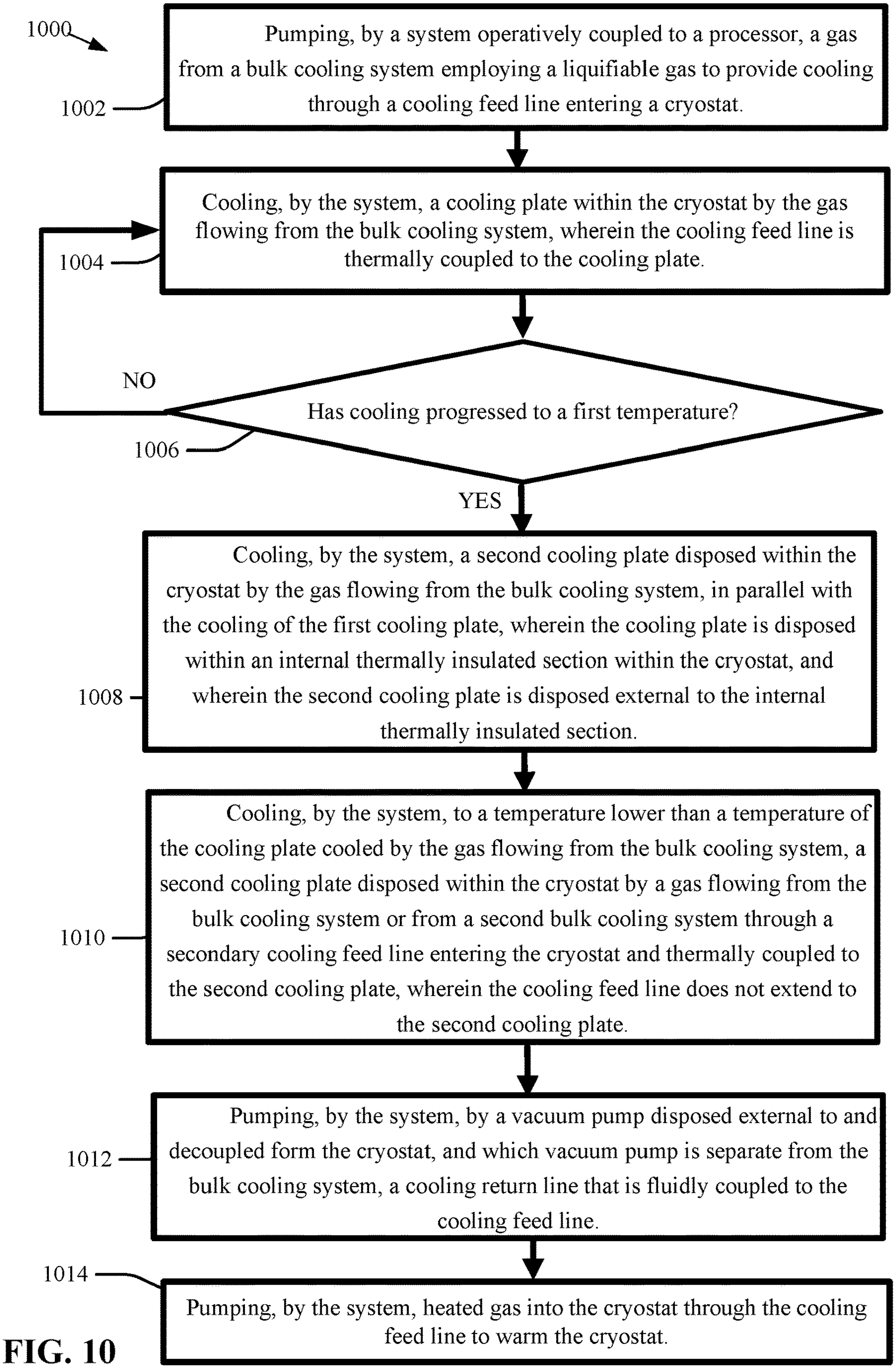
FIG. 10 illustrates a flow diagram of an example method of use of an electronic structure, in accordance with one or more embodiments described herein.

Referring next to FIG. 10, illustrated is a flow diagram of an example, non-limiting method 1000 that can provide a process to use an electronic structure, such as the non-limiting system 200, in accordance with one or more embodiments described herein. While the non-limiting method 1000 is described relative to the non-limiting system 200 of FIG. 2 in use at the non-limiting system 100, the non-limiting method 1000 can be applicable also to other structures, devices and/or systems described herein, such as any of the non-limiting system 400, 600 and/or 800, and/or such as a system other than comprising a quantum system. Repetitive description of like elements and/or processes employed in respective embodiments is omitted for sake of brevity.

At 1002, the non-limiting method 1000 can comprise pumping, by a system operatively coupled to a processor (e.g., bulk cooling system 208, 408), a gas from a bulk cooling system (e.g., bulk cooling system 208, 408) employing a liquifiable gas to provide cooling through a cooling feed line (e.g., cooling supply line 212*a*, 412*a*) entering a cryostat (e.g., cryostat 206, 406).

At 1004, the non-limiting method 1000 can comprise cooling, by the system (e.g., bulk cooling system 208, 408), a cooling plate with the cryostat by the gas flowing from the bulk cooling system, wherein the cooling feed line is thermally coupled to the cooling plate.

At 1008, the non-limiting method 1000 can comprise determining, by the system (e.g., quantum operation component 103), whether cooling within the cryostat has progressed to a first temperature. Where the answer is yes, the non-limiting method 1000 can proceed to step 1008. Where the answer is no, the non-limiting method 1000 can proceed back to step 1004 to continue cooling at least the cooling plate.

At 1008, the non-limiting method 1000 can comprise cooling, by the system (e.g., non-limiting system 100), a second cooling plate disposed within the cryostat by the gas flowing from the bulk cooling system, in parallel with the cooling of the first cooling plate, wherein the cooling plate is disposed within an internal thermally insulated section within the cryostat, and wherein the second cooling plate is disposed external to the internal thermally insulated section.

At 1010, the non-limiting method 1000 can comprise cooling, by the system (e.g., non-limiting system 100), to a temperature lower than a temperature of the cooling plate cooled by the gas flowing from the bulk cooling system, a second cooling plate disposed within the cryostat by a gas flowing from the bulk cooling system or from a second bulk cooling system through a secondary cooling feed line entering the cryostat and thermally coupled to the second cooling plate, wherein the cooling feed line does not extend to the second cooling plate.

At 1012, the non-limiting method 1000 can comprise pumping, by the system (e.g., non-limiting system 100), by a vacuum pump (e.g., vacuum pump 532) disposed external to and decoupled from the cryostat, and which vacuum pump is separate from the bulk cooling system, a cooling return line that is fluidly coupled to the cooling feed line.

At 1014, the non-limiting method 1000 can comprise pumping, by the system (e.g., non-limiting system 100), heated gas into the cryostat through the cooling feed line to warm the cryostat.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems and/or methods provided herein relate to cooling of a component within a chamber of a cryostat. A system can comprise a cryostat having a cooling plate disposed within the cryostat, and a cooling feed line extending into the cryostat from external to the cryostat, which cooling feed line is thermally coupled to the cooling plate by a heat exchanger. In one or more embodiments, the system further can comprise a bulk cooling system that employs a liquifiable gas to provide cooling, wherein the bulk cooling system is fluidly coupled to the cooling feed line. In one or more embodiments, the system further can comprise a vacuum pump disposed at the cooling return line and external to the cryostat and physically decoupled from the cryostat by a section of the cooling return line disposed between the cryostat and the vacuum pump.

A system comprises a cryostat having a cooling plate disposed within the cryostat and a cooling feed line extending into the cryostat from external to the cryostat, which cooling feed line is thermally coupled to the cooling plate by a heat exchanger.

The system of the preceding paragraph can comprise, optionally, a bulk cooling system that employs a liquifiable gas to provide cooling, wherein the bulk cooling system is fluidly coupled to the cooling feed line.

Regarding the system of any preceding paragraph, the bulk cooling system can comprise, optionally, a liquid nitrogen cooling system fluidly coupled to the cooling feed line and a liquid helium cooling system fluidly coupled to a second cooling feed line that also extends into the cryostat from external to the cryostat and is thermally coupled to the cooling plate by a second heat exchanger.

Regarding the system of any preceding paragraph, the cooling plate can be disposed, optionally, within an internal thermally insulated section within the cryostat, and wherein a second cooling plate is disposed within the cryostat but external to the internal thermally insulated section.

Regarding the system of any preceding paragraph, the cryostat can comprise, optionally, a dilution refrigeration unit disposed within the internal thermally insulated section.

The system of any preceding paragraph can comprise, optionally, a cooling return line fluidly coupled to the cooling feed line at the cooling plate and extending out of the cryostat from the cooling plate, and optionally can comprise a vacuum pump disposed at the cooling return line and external to the cryostat.

Regarding the system of the preceding paragraph, the vacuum pump can be physically decoupled, optionally, from the cryostat by a section of the cooling return line disposed between the cryostat and the vacuum pump.

The system of any preceding paragraph can function, optionally, absent any pump coupled at an external surface of the cryostat or extending into the cryostat.

The system of any preceding paragraph can comprise, optionally, a second cooling plate disposed within the cryostat, and a second cooling feed line extending into the cryostat, which second cooling feed line is thermally coupled to the second cooling plate and does not extend to the cooling plate.

The system of the preceding paragraph can comprise, optionally, a first bulk cooling system that employs a liquifiable gas for cooling of the cryostat, which bulk cooling system is fluidly coupled to the cooling feed line, and a second bulk cooling system that employs a liquifiable gas for cooling of the cryostat, which second bulk cooling system is fluidly coupled to the second cooling feed line, wherein the cooling feed line is coupled to a heat exchanger at the cooling plate, and wherein the second cooling feed line is coupled to a second heat exchanger at the second cooling plate.

The system of any preceding paragraph can comprise an internal thermally insulated section of the cryostat being connected to and open to a second internal thermally insulated section of a second cryostat, wherein the second cryostat can be cooled by the bulk cooling system.

Regarding the system of the preceding paragraph, the internal thermally insulated section of the cryostat can comprise a mixing chamber plate, the second internal thermally insulated section of the second cryostat can comprise a second mixing chamber plate, and the first mixing chamber plate and the second mixing chamber plate can be coupled to one another by an interconnecting plate section disposed between the cryostat and the second cryostat and disposed within a connecting thermally insulated section connecting the internal thermally insulated section to the second internal thermally insulated section.

The system of any preceding paragraph can comprise a connecting thermally and vacuum-scalable insulated section extending between and open to an internal portion of the cryostat and a second internal portion of a second cryostat.

The system of the preceding paragraph further can comprise a mixing chamber plate of the cryostat and a second mixing chamber plate of the second cryostat being coupled to one another through the connecting thermally and vacuum-scalable insulated section.

Another system comprises a cryostat having a primary cooling feed line extending into the cryostat, which primary cooling feed line is both physically coupled and thermally coupled to a cold plate within the cryostat by a heat exchanger, a bulk cooling system employing a liquifiable gas to provide cooling, and a main cooling feed line fluidly coupled to the bulk cooling system and to the primary cooling feedline.

Regarding the system of the preceding paragraph, optionally, the first primary cooling feed line can be thermally coupled to each cold plate in the cryostat.

The system of any preceding paragraph can comprise, optionally, a second bulk cooling system employing a liquifiable gas to provide cooling, and an auxiliary cooling feed line extending into the cryostat, fluidly coupled to a second main cooling feed line that is fluidly coupled to the second bulk cooling system, and thermally coupled to less than all cold plates within the cryostat.

The system of any preceding paragraph can comprise, optionally, a primary cooling return line fluidly coupled to the primary cooling feed line at the cooling plate and extending out of the cryostat from the cooling plate, and a vacuum pump at the primary cooling return line and external to the cryostat.

Regarding the system of the preceding paragraph, optionally, the vacuum pump can be physically decoupled from the cryostat by a section of the cooling return line disposed between the cryostat and the vacuum pump.

A method for operating a cryostat comprises pumping, by a system operatively coupled to a processor, a gas from a bulk cooling system, employing a liquifiable gas to provide cooling, through a cooling feed line entering a cryostat, and cooling, by the system, the cooling plate within the cryostat by the gas flowing from the bulk cooling system, wherein the cooling feed line is thermally coupled to the cooling plate.

The method of the preceding paragraph can comprise, optionally, cooling, by the system, a second cooling plate disposed within the cryostat by the gas flowing from the bulk cooling system, in parallel with the cooling of the first cooling plate, wherein the cooling plate is disposed within an internal thermally insulated section within the cryostat, and wherein the second cooling plate is disposed external to the internal thermally insulated section.

The method of any preceding paragraph can comprise, optionally, cooling, by the system, to a temperature lower than a temperature of the cooling plate cooled by the gas flowing from the bulk cooling system, a second cooling plate disposed within the cryostat by a gas flowing from the bulk cooling system or from a second bulk cooling system through a secondary cooling feed line entering the cryostat and thermally coupled to the second cooling plate, wherein the cooling feed line does not extend to the second cooling plate.

The method of any preceding paragraph can comprise, optionally, pumping, by the system, by a vacuum pump disposed external to and decoupled from the cryostat, and which vacuum pump is separate from the bulk cooling system, a cooling return line that is fluidly coupled to the cooling feed line.

The method of any preceding paragraph can comprise, optionally, pumping, by the system, heated gas into the cryostat through the cooling feed line to warm the cryostat.

An advantage of the above-mentioned systems and/or method can be non-use of an existing pulse tube system and thus prevention of affect of components internal to the cryostat by pulse vibrations emanating from such pulse tube system.

Another advantage of the above-mentioned systems and/or method can be more efficient setup, start up, warm up and/or maintenance of a cryostat, allowing for more available run time of a respective quantum system employing components within the cryostat. This benefit itself can lead to greater queue throughput of quantum programs being run and more availability of quantum systems for customers, thus leading to greater customer use and satisfaction.

Still another advantage of the above-mentioned systems and/or method can be the use of a bulk cooling system with pumps physically separate from the cryostat can allow for decrease in cooling time for the cryostat while also reducing the affect of any machine vibration from the bulk cooling system on the cryostat.

Yet another advantage of the above-mentioned systems and/or method can be that more than one bulk cooling system can be employed to cool the cryostat, such as to cool different internal compartments of the vacuum chamber to different temperatures. This can allow for even more rapid decrease in cooling time, such as where one bulk cooling system using a first liquifiable gas can be used to drop an internal temperature within the cryostat to a first temperature that is higher than a second temperature achievable by a second bulk cooling system using a second liquifiable gas (different from the first liquifiable gas).

Another advantage of the above-mentioned systems and/or method can be a reduction in any machine vibration from affecting internal aspects of the cryostat. Use of the vacuum pump can allow for even more rapid decrease in cooling time, and further can allow for an even lower cooling temperature. This advantage in itself can allow for more rapid cooling of a most internal section of the cryostat by requiring less of the dilution refrigerator for cooling such most internal section. That is, a temperature at which a dilution refrigerator can be switched on can be lower than as with existing cryostat frameworks.

Indeed, in view of the one or more embodiments described herein, a practical application of the systems and/or method of use described herein can be ability to more rapidly lower the temperature of a cryostat, more rapidly raise a temperature of a cryostat and/or more rapidly perform maintenance on internal components of a cryostat that with existing cryostat frameworks. This can be due to use of one or more liquifiable gas farms, a vacuum pump on a return line, removal of direct physical connection of pumps, removal of pulse tube systems, and/or use of heat exchangers at each internal cryostat plate. One or more of these aspects also can provide reduction and/or prevention of pump vibration from affecting components internal to the cryostat.

This is a useful and practical application providing enhanced (e.g., improved and/or optimized) operation of the hardware and/or software components of a cryogenic system (e.g., of a quantum system) by allowing for efficient setup and vacuum break down relative to operation of one or more quantum programs using components (e.g., a quantum logic circuit) internal to the cryostat. Overall, such tools can constitute a concrete and tangible technical and/or physical improvement in the fields of cryogenic devices and/or quantum computing.

Furthermore, one or more embodiments described herein can be employed in a real-world system based on the disclosed teachings. For example, one or more cryogenic systems described herein can function with a quantum system and/or with interconnected quantum systems that can measure a real-world qubit state of one or more qubits, such as superconducting qubits, at the cryostat, by executing a quantum source code at some level of the quantum system.

Moreover, a device and/or method described herein can be implemented in scale. Indeed, use of plural cryostats in a single cryostat system is feasible. Further, multiple such cryostat systems can be used in plural, such as for one or more quantum systems (or other non-quantum systems) that can be disconnected or connected to one another and cooled by a same one or more bulk cooling systems. Accordingly, scalability of such multi-cryostat systems and/or multi cryo-farm systems can be beyond 5,000 qubits interconnected to one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Turning next to FIG. 11, a detailed description is provided of additional context for the one or more embodiments described herein at FIGS. 1-10.

FIG. 11 and the following discussion are intended to provide a brief, general description of a suitable computing environment 1000 in which one or more embodiments described herein at FIGS. 1-10 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as translation of an original source code based on a configuration of a target system by the quantum circuit execution code at block 2000. In addition to block 2000, computing environment 1100 includes, for example, computer 1101, wide area network (WAN) 1102, end user device (EUD) 1103, remote server 1104, public cloud 1105, and private cloud 1108. In this embodiment, computer 1101 includes processor set 1110 (including processing circuitry 1120 and cache 1121), communication fabric 1111, volatile memory 1112, persistent storage 1113 (including operating system 1122 and block 2000, as identified above), peripheral device set 1114 (including user interface (UI), device set 1123, storage 1124, and Internet of Things (IOT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 2000 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid-state storage devices. Operating system 1122 may take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101) and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1108 is similar to public cloud 1105, except that the computing resources are only available for use by a single enterprise. While private cloud 1108 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1108 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms “component,” “system,” “platform” and/or “interface” can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Moreover, articles “a” and “an” as used in the subject specification and annexed drawings should generally be construed to mean “one or more” unless specified otherwise or clear from context to be directed to a singular form. As used herein, the terms “example” and/or “exemplary” are utilized to mean serving as an example, instance, or illustration. For the avoidance of doubt, the subject matter described herein is not limited by such examples. In addition, any aspect or design described herein as an “example” and/or “exemplary” is not necessarily to be construed as preferred or advantageous over other aspects or designs, nor is it meant to preclude equivalent exemplary structures and techniques known to those of ordinary skill in the art.

As it is employed in the subject specification, the term “processor” can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as “store,” “storage,” “data store,” data storage,” “database,” and substantially any other information storage component relevant to operation and functionality of a component are utilized to refer to “memory components,” entities embodied in a “memory,” or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as externa cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms “includes,” “has,” “possesses,” and the like are used in the detailed description, claims, appendices and/or drawings such terms are intended to be inclusive in a manner similar to the term “comprising” as “comprising” is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:

a cryostat having a body and a cooling plate disposed within the cryostat body;

a cooling feed line extending into the cryostat from external to the cryostat, which cooling feed line is thermally coupled to the cooling plate by a heat exchanger;

a bulk cooling system that employs a first liquifiable gas and the bulk cooling system employing, or a second bulk cooling system that employs, a second liquifiable gas to provide cooling, wherein the bulk cooling system is fluidly coupled to the cooling feed line and wherein one or more pumps providing the first liquifiable gas or the second liquifiable gas to and from the bulk cooling system are decoupled from and spaced apart from the cryostat body, wherein the first liquifiable gas comprises an atomic element not comprised by the second liquifiable gas, and wherein each of the first liquifiable gas and the second liquifiable gas are employed during a common cooling cycle to cool the cryostat.

2. The system of claim 1, wherein the bulk cooling system comprises, a liquid nitrogen cooling system fluidly coupled to the cooling feed line and a liquid helium cooling system fluidly coupled to a second cooling feed line that also extends into the cryostat from external to the cryostat and is thermally coupled to the cooling plate by a second heat exchanger, and wherein the first liquifiable gas is the liquid nitrogen, and the second liquifiable gas is the liquid helium.

3. The system of claim 1, wherein the cooling plate is disposed within an internal thermally insulated section within the cryostat, wherein a second cooling plate is disposed within the cryostat but external to the internal thermally insulated section, and wherein pumps, of the one or more pumps, for separately cooling the first cooling plate and the second cooling plate, are disposed external to, spaced apart from, and physically decoupled from the cryostat body.

4. The system of claim 3, wherein the cryostat further comprises a dilution refrigeration unit disposed within the internal thermally insulated section.

5. The system of claim 1, further comprising:

a cooling return line fluidly coupled to the cooling feed line at the cooling plate and extending out of the cryostat from the cooling plate; and a vacuum pump, of the one or more pumps, disposed at the cooling return line and external to the cryostat.

6. The system of claim 5, wherein the vacuum pump is spaced apart from and physically decoupled from the cryostat body at least by a section of the cooling return line disposed between the cryostat body and the vacuum pump.

7. The system of claim 1, absent any pump, of the one or more pumps, coupled at an external surface of the cryostat body or extending into the cryostat.

8. The system of claim 1, further comprising:

a second cooling plate disposed within the cryostat;

a second cooling feed line extending into the cryostat, which second cooling feed line is thermally coupled to the second cooling plate and does not extend to the cooling plate; and a second bulk cooling system that employs a third liquifiable gas for cooling of the cryostat, which second bulk cooling system is fluidly coupled to the second cooling feed line, wherein the third liquifiable gas comprises an atomic element not comprised by the first liquifiable gas or comprised by the second liquifiable gas, and wherein each of the first liquifiable gas, the second liquifiable gas, and the third liquifiable gas are employed during the common cooling cycle to cool the cryostat.

9. A system comprising:

a cryostat having a cryostat body, a cold plate and a second cold plate within the cryostat body, and primary cooling feed line and an auxiliary cooling feed line extending into the cryostat, wherein the primary cooling feed line is both physically coupled and thermally coupled to the cold plate within the cryostat body by a heat exchanger, and wherein the auxiliary cooling feed line is both physically coupled and thermally coupled to the second cold plate;

a bulk cooling system employing a first liquifiable gas to provide cooling;

a main cooling feed line fluidly coupled to the bulk cooling system and to the primary cooling feedline, wherein one or more pumps providing the liquifiable gas to and from the bulk cooling system are decoupled from and spaced apart from the cryostat body;

a second bulk cooling system employing a second liquifiable gas to provide cooling; and a second main cooling feed line fluidly coupled to the second bulk cooling system and to the auxiliary cooling feed line, wherein one or more pumps providing the second liquifiable gas to and from the second bulk cooling system are decoupled from and spaced apart from the cryostat body, wherein the first liquifiable gas comprises an atomic element not comprised by the second liquifiable gas, and wherein each of the first liquifiable gas and the second liquifiable gas are employed during a common cooling cycle to cool the cryostat.

10. The system of claim 9, wherein the primary cooling feed line is thermally coupled to each cold plate in the cryostat, including the cold plate and the second cold plate.

11. The system of claim 9, wherein the auxiliary cooling feed line is thermally coupled to less than all cold plates within the cryostat.

12. The system of claim 9, further comprising:

a primary cooling return line fluidly coupled to the primary cooling feed line at the cooling plate and extending out of the cryostat from the cooling plate; and a vacuum pump, of the one or more pumps, at the primary cooling return line and external to the cryostat.

13. A method for operating a cryostat, the method comprising:

pumping, by a system operatively coupled to a processor, a gas from a bulk cooling system, through a cooling feed line entering a cryostat, thereby providing cooling to the cryostat;

cooling, by the system, the cooling plate within the cryostat by the gas flowing from the bulk cooling system, wherein the cooling feed line is thermally coupled to the cooling plate, wherein one or more pumps providing the gas to and from the bulk cooling system are spaced apart from and decoupled from the cryostat body; and cooling, by the system, the cooling plate or a second cooling plate disposed within the cryostat by a second gas flowing from the bulk cooling system or from a second bulk cooling system, wherein the first gas comprises an atomic element not comprised by the second gas, and wherein each of the first gas and the second gas are employed during a common cooling cycle to cool the cryostat.

14. The method according to claim 13, wherein the first cooling plate is disposed within an internal thermally insulated section within the cryostat, wherein the second cooling plate is disposed external to the internal thermally insulated section, and wherein pumps, of the one or more pumps, for separately cooling the first cooling plate and the second cooling plate are disposed external to and physically decoupled from the cryostat body.

15. The method according to claim 13, further comprising:

wherein the cooling the cooling plate or the second cooling plate disposed within the cryostat by a second gas comprises cooling, by the system, to a temperature lower than a temperature of the cooling plate cooled by the gas flowing from the bulk cooling system, the second cooling plate disposed within the cryostat by the second gas flowing from the bulk cooling system or from the second bulk cooling system through a secondary cooling feed line entering the cryostat and thermally coupled to the second cooling plate, wherein the cooling feed line does not extend to the second cooling plate.

16. The method according to claim 13, further comprising:

pumping, by the system, by a vacuum pump, of the one or more pumps, a cooling return line that is fluidly coupled to the cooling feed line, wherein the vacuum pump is disposed external to, spaced apart from, and physically decoupled from the cryostat body, and wherein the vacuum pump is separate from the bulk cooling system.

17. The method according to claim 13, further comprising:

pumping, by the system, heated gas into the cryostat through the cooling feed line to warm the cryostat.

18. The system of claim 8, wherein the bulk cooling system supplies the liquifiable gas to a plurality of cryostats, including the cryostat, that are physically spaced apart from one another, and wherein the second bulk cooling system supplies the second liquifiable gas to the plurality of cryostats, including the cryostat.

19. The system of claim 9, wherein the bulk cooling system supplies the liquifiable gas to a plurality of cryostats, including the cryostat, that are physically spaced apart from one another, and wherein the second bulk cooling system supplies the second liquifiable gas to the plurality of cryostats, including the cryostat.

20. The system of claim 9, wherein the bulk cooling system or the second bulk cooling system employs a third liquifiable gas to provide cooling, wherein the third liquifiable gas comprises an atomic element not comprised by the first liquifiable gas or comprised by the second liquifiable gas, and wherein each of the first liquifiable gas, the second liquifiable gas, and the third liquifiable gas are employed during the common cooling cycle to cool the cryostat.

* * * * *